United States Patent
Willis

(10) Patent No.: US 9,844,980 B1
(45) Date of Patent: Dec. 19, 2017

(54) MOBILITY DEVICE HAVING WALKING WHEEL ASSEMBLY FOR MOVING AN OBJECT ACROSS NON-PLANAR AREAS

(71) Applicant: Douglas G. Willis, Fresno, CA (US)

(72) Inventor: Douglas G. Willis, Fresno, CA (US)

( * ) Notice: Subject to any disclaimer, the term of this patent is extended or adjusted under 35 U.S.C. 154(b) by 0 days.

(21) Appl. No.: 15/209,513

(22) Filed: Jul. 13, 2016

(51) Int. Cl.
*A61G 5/06* (2006.01)
*B60B 33/00* (2006.01)
*B62B 5/00* (2006.01)
*A61G 5/10* (2006.01)

(52) U.S. Cl.
CPC ...... *B60B 33/0047* (2013.01); *B60B 33/0002* (2013.01); *B60B 33/0042* (2013.01); *A61G 5/10* (2013.01); *B60B 2200/22* (2013.01); *B60B 2900/721* (2013.01); *B60Y 2200/84* (2013.01); *B62B 5/0083* (2013.01)

(58) Field of Classification Search
CPC ............ B60B 33/047; B60B 33/0042; B60B 33/0002; B60B 2900/721; B60B 33/057; B60Y 2200/84; B62B 5/0083; Y10T 16/1853; A61G 5/06
See application file for complete search history.

(56) References Cited

U.S. PATENT DOCUMENTS

| | | | | |
|---|---|---|---|---|
| 3,827,718 A | * | 8/1974 | Curry | A61G 5/06 188/2 F |
| 4,128,137 A | * | 12/1978 | Booth | A61G 5/043 180/6.5 |
| 2003/0122327 A1 | * | 7/2003 | Wu | A61G 5/045 280/5.2 |
| 2010/0251514 A1 | * | 10/2010 | Goldberg | B60B 33/0028 16/47 |
| 2011/0023268 A1 | * | 2/2011 | Smith | B60B 33/0007 16/47 |
| 2011/0232708 A1 | * | 9/2011 | Kemp | A61H 3/04 135/67 |
| 2012/0068423 A1 | * | 3/2012 | Otterson | B60B 33/00 280/5.28 |

* cited by examiner

Primary Examiner — Brian L Swenson
(74) Attorney, Agent, or Firm — Richard A. Ryan

(57) ABSTRACT

A mobility device for moving an object across a surface having a non-planar obstruction to allow movement of the object over the obstruction. The mobility device has a walking wheel assembly and an attachment mechanism. The walking wheel assembly has at least two wheels and an offset camshaft. The offset camshaft has a lobe associated with each wheel. The lobes are in a non-linear relationship such that one wheel is a leading wheel and one wheel is a trailing wheel. The offset camshaft allows the leading and trailing wheels to pivot upward and downward independent of each other. The attachment mechanism attaches the walking wheel assembly to the object. The mobility device can include a deflector assembly having a pair of deflector arms that are pivotally connected to a cam-axle which is attached to the offset camshaft to help guide the mobility device over non-planar areas.

20 Claims, 28 Drawing Sheets

MOBILITY DEVICE HAVING WALKING WHEEL ASSEMBLY FOR MOVING AN OBJECT ACROSS NON-PLANAR AREAS

REFERENCE TO RELATED APPLICATIONS

This patent application claims priority to U.S. patent application Ser. No. 15/042,149 filed Feb. 11, 2016, which claimed priority to U.S. Provisional Patent Application No. 62/115,127 filed Feb. 11, 2015.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The field of the present invention relates generally to devices that are utilized to moveably support a load as it moves across a surface. In particular, the present invention relates to devices that are specially configured to moveably support a load across a surface having uneven or irregular areas. Even more particularly this invention relates to mobility devices that may be configured as a caster, carriage or the like and which are configured to more easily and smoothly allow a load to be moved across an uneven or irregular area with less resistance and improved stability.

B. Background

Mobility devices are devices which are configured to help a person move an object across a surface. For purposes of the present invention, mobility devices generally comprise a wheel assembly having one or more wheels and an attachment mechanism configured to attach the mobility device to the object in a manner which allows the wheels to rotate relative to the object and on the surface across which the object is to be moved. In some configurations, a mobility device attaches directly to part of the object, typically through an axle bolt or the like over which the wheels rotate. In other configurations, the mobility device is configured as a caster or carriage assembly, which usually comprise two or more casters, that attach to the object. The configuration and use of such mobility devices are generally well known in the art and are commonly utilized to assist in moving an object from one location to another across a floor, sidewalk, street, deck or other surface. Typically, mobility devices are attached to, integral with or otherwise configured to attach to a component of or on the object, such as a lower surface, support frame or the like, in a manner that allows a person to move the object across a surface with much less effort than would otherwise be required. Mobility devices, including casters and the like, are utilized with a wide variety of different types of objects, including wheelchairs, furniture, medical gurneys, suitcases, carts, toolboxes and the like. Carriage assemblies are utilized in numerous types of industry where it is necessary or desirable to efficiently and safely move one or more objects, particularly very heavy objects, across a surface. For instance, automobile and airplane factories frequently utilize carriage assemblies to move engines, frames, transmissions and other components from one part of the factory to another.

The prior art comprises a wide variety of different configurations for mobility devices. Most prior art mobility devices tend to function well on smooth surfaces, such as floors and the like, but they do not generally function very well on surfaces that have uneven and/or irregular areas. Even surfaces that appear to be planar will often, if not usually, have areas where the surface is not planar. For instance, concrete or other hard, relatively smooth surfaces that are utilized as sidewalks, driveways and like surfaces generally comprise a number of expansion joints that extend across the width of the surface, each of which results in an uneven or irregular area that must be traversed. Movement through a doorway will require the person moving the object to cross over a door jamb or sliding door track in order to transfer the object, moveably supported by the caster or carriage assembly. In addition to expansion joints and door jambs, conventional mobility devices, including casters and carriage assemblies, also tend to not function well on surfaces that have small obstructions, such as rocks, screws, bolts and the like, on the surface in the path where a wheel of the device will traverse. As is well known in the art, such relatively small, but nevertheless problematic, objects are common on floors in homes, garages, factories, airports and the like. Some floors may be made out of materials, such as certain types of tile, brick and the like, that result in a relatively large number of non-planar areas. Movement of an object, such as a wheelchair, cart or suitcase, through a train or subway station often requires the person moving the object to move across rails and other non-planar areas. In addition, floors, driveways, sidewalks or other surfaces may have surface projections that are positioned on the surface for certain beneficial purposes, such as to warn of a possible crossing hazard.

As well known by persons who must move an object supported by a mobility device across an uneven or irregular area of the surface or a small object or other small obstruction on the surface (hereinafter such uneven/irregular area and object/obstruction are collectively referred to as a "non-planar area"), when a wheel of a caster attempts to pass over a non-planar area, the wheel tends to have difficulty crossing the non-planar area. As also well known, the difficulty of passing across such a non-planar area is significantly compounded when the object or the load carried by the object is heavy. Such difficulty can substantially decrease the efficient operation of moving the object. In certain situations, often depending on the size and shape of the non-planar area and the size and shape of the wheel assembly, the non-planar area can result in a rapid cessation of the object's forward movement. Naturally, these difficulties can significantly reduce the efficiency of moving an object across a surface. In addition to a significant loss of efficiency, the problem associated with moving a heavy object across a surface supported above the surface by a conventional mobility device includes the risk of tipping the object or its load due to the mobility device being inherently unstable on non-planar areas. The risk of tipping is substantially increased when changing directions and under other circumstances, including when the mobility device encounters something on the surface that tends to restrict travel in the selected direction. Generally, the instability of the object results from the load being supported by the mobility device tending to bear down on the caster's support post, which produces a tipping moment relative to the wheel axle. In addition, the angled vector of the weight of the object being moved tends to be higher than the wheel axle and, therefore, will drive the wheel down against the uneven or irregular surface, the obstruction on the surface or other non-planar area, making it more difficult to traverse the non-planar area. The tipping can result in people (i.e., in a wheelchair, gurney, wheeled bed or the like) or items (i.e., products in or on a cart) being supported by the object being dumped on the surface, which can injure the person or damage the items.

Various mobility devices have been devised which are better adapted to move an object, particularly a heavy object, across an uneven or irregular surface and over obstructions on the surface. One such prior art device, configured as a caster, is set forth in U.S. Pat. No. 5,507,069, which issued to one of the inventors of the present invention. The above patent describes an articulated caster having a base assembly with three or more wheels attached thereto and extending radially from the center of the base and a pivot arm having a housing at a lower end that is received in a recessed area of the base. The upper end of the pivot arm connects to the apparatus using the caster. The pivot housing includes a spherical chamber that contains a pivot ball. A pivot shaft passes through a pivot hole in the pivot ball, an angled slot in the housing and through a pair of pivot shaft holes provided in the opposing walls of the base recess area. The pivot holes are disposed as low as possible for improved stability. U.S. Pat. No. 7,146,683, U.S. Pat. No. 7,500,285 and U.S. Pat. No. 7,506,405, which also issued to one of the inventors of the present invention, describes an articulated caster comprising a base assembly, at least three wheels pivotally attached to the base assembly, a pivot arm having an upper end configured to attach to an object to be moved and a universal joint at a lower end of the pivot arm that is attached to the base and configured for pivotal motion about two perpendicular axes. A brake assembly, attached to the pivot arm, is configured to force a brake pad into frictional engagement with a surface to place the brake assembly in its engaged position. These patents also describe combining multiple casters together to form a compound carriage system to support larger and/or heavier loads without excessive elevation of such loads and describe a carriage system wherein the load is carried on a load supporting section of a frame between pairs of carriages. A particular disadvantage of the three-wheeled configuration is that there are some possible angles of approach to obstacles by the driving moment that can cause shock to the load and possible damage to one or more wheels because the lead wheel may not lead enough to provide positive deflection.

A known disadvantage of many prior art mobility devices, including those described above, is that the components thereof require varying degrees of machining, welding and/or break bending to configure the mobility device for use with a frame to move an object across a surface. Such operations increase the cost of assembling the mobility device, both in materials and in labor, and result in structural weak points that can fail or otherwise reduce the useful life of the mobility device. In certain circumstances, the impact of these operations can significantly impact the cost and life of the mobility device. In addition to increasing the initial cost, the manner in which many prior art mobility devices are configured makes it difficult and relatively expensive to repair any parts that fail or replace any parts that have worn.

While the above patents represent a substantial improvement over prior art mobility devices, there is a need for an improved mobility device for use to move objects across a non-planar area (i.e., an uneven or irregular surface or a surface having small obstructions). Specifically, what is needed is an improved mobility device that is more effective and efficient at moving an object, particularly heavy and/or large objects, across a surface that has one or more non-planar areas that could stop or otherwise impede the movement of the object. The preferred mobility device should be configured such that it allows the wheels to easily, efficiently and in a stable manner move over non-planar areas. The new mobility device should be adaptable for use with a wide variety of different types of objects. A new mobility device should be configured so as to be positively disposed when approaching obstacles from any approach angle. Preferably, the mobility device should be configured such that it is relatively easy to assemble so as to reduce the cost of manufacture and the need for expensive skilled labor. The preferred mobility device should be configured to be attached with like mobility devices to a platform or like component to provide a carriage assembly that can more efficiently and safely move very large and/or heavy objects across a surface.

SUMMARY OF THE INVENTION

The mobility device of the present invention provides the benefits and solves the problems disclosed above. That is to say, the present invention discloses a mobility device which effectively, efficiently and safely moves an object across a surface, including areas of the surface that are uneven or irregular or which have small obstructions thereon (i.e., non-planar areas), by not being impeded by the non-planar area and provide stable movement for the object. The mobility device of the present invention comprises a walking wheel assembly that moves across the surface and an attachment mechanism that attaches the walking wheel assembly to the object. The walking wheel assembly comprises at least a forward wheel and a rearward wheel that are structured and arranged such that when the forward wheel hits an uneven or irregular area or an obstruction, the forward wheel is driven up over the non-planar area while the rearward wheel remains on the planar area of the surface so as not to impede movement of the object being moved by the mobility device. When the rearward wheel hits the non-planar area, the forward wheel is past the non-planar area, thereby allowing the mobility device to effectively "walk" over the non-planar area. The mobility device of the present invention significantly reduces the likelihood that a non-planar area of a surface will result in the object being moved across the surface coming to a quick stop or being subjected to other action that could result in the object tipping and placing the person or items being carried by the object in jeopardy of being thrown to the ground. In a preferred embodiment of the present invention, the new mobility device is relatively easy to assemble, which reduces the cost of such assembly and the need for expensive skilled labor. The new mobility device, particularly when configured as a caster, can be attached to a platform with one or more similarly configured devices to provide a carriage assembly that can efficiently and safely move very large and/or heavy objects across a surface that may have non-planar areas. These and other benefits of the present invention will be readily understood and appreciated by those skilled in the art.

The new mobility device of the present invention generally comprises a walking wheel assembly and an attachment mechanism. The walking wheel assembly has at least a first wheel, a second wheel and an offset camshaft that interconnects the first wheel and the second wheel. Each of the first wheel and the second wheel are made out of material which are selected to move the mobility device across the surface. The offset camshaft has a first lobe that is associated with the first wheel and a second lobe which is associated with the second wheel. The offset camshaft is structured and arranged with the first lobe being in a non-linear relationship with the second lobe to define one of the wheels as a leading wheel and the other wheel as a trailing wheel. The offset camshaft is further structured and arranged to pivot the first wheel or the second wheel generally upward or downward relative to the other wheel when one of the wheels contacts a non-planar area on the surface. The attachment mechanism attaches the walking wheel assembly to the object in a manner that moveably supports the object on the surface and across or over the non-planar areas of the surface. In one embodiment of the mobility device, the attachment mechanism is an axle bolt that is sized and configured to extend through the offset camshaft and each of the first wheel and the second wheel to secure the mobility device to one or more frame members of the object. In another embodiment of the mobility device, the attachment mechanism is a caster assembly comprising a pedestal and a support frame. The pedestal is moveably supported above the surface by the walking wheel assembly. The pedestal has a mounting device that attaches to the object. The support frame has one more frame members interconnecting the mounting device and the walking wheel assembly. The pedestal is configured to allow each of the first wheel and the second wheel to move straight and pivot on the surface relative to the object so as to directionally move the object.

In a specially configured embodiment of the present invention, the new mobility device is configured as a caster that generally comprises a walking wheel assembly and a pedestal. The walking wheel assembly has at least a first wheel, a second wheel and an offset camshaft interconnecting the first wheel and the second wheel. Each of the first wheel and the second wheel are made out of materials selected to move the caster across the surface. The offset camshaft has a first lobe associated with the first wheel and a second lobe associated with the second wheel. The offset camshaft is structured and arranged with the first lobe in a non-linear relationship with the second lobe so as to define one of the first wheel and the second wheel as a leading wheel and the other of the first wheel and the second wheel as a trailing wheel. The offset camshaft further structured and arranged to pivot one of the first wheel and the second wheel upward or downward relative to the other of the first wheel and the second wheel when one of the first wheel and the second wheel contacts a non-planar area on the surface. The pedestal is moveably supported above the surface by the walking wheel assembly, the pedestal having a mounting device that is structured and arranged to attach to the object and a support frame having one more frame members extending downward from and interconnecting the mounting device and the walking wheel assembly. The pedestal is configured to allow each of the first wheel and the second wheel to move straight and pivot on the surface relative to the object so as to directionally move the object.

In another embodiment of the mobility device of the present invention, the mobility device includes, in addition to the walking wheel assembly and attachment mechanism set forth above, a deflector assembly that is disposed between the first wheel and the second wheel of the walking wheel assembly. The deflector assembly has a cam-axle that is attached to or integral with the offset camshaft, a leading deflector arm which is pivotally attached to the cam-axle and a trailing deflector arm pivotally that is attached to the cam-axle. The leading deflector arm and the trailing deflector arm are each sized and configured to contact the non-planar area to assist in smoothly and with improved stability moving the object over or across the non-planar area. The cam-axle comprises a frame that defines a leading section disposed generally toward a leading end of the cam-axle and a trailing section disposed generally toward a trailing end of the cam-axle. The leading deflector arm is pivotally attached to the leading section so as to pivot forward and rearward relative to the leading wheel. The trailing deflector arm is pivotally attached to the trailing section so as to pivot forward and rearward relative to the trailing wheel. In a preferred configuration, each of the deflector arms comprise a first deflector plate, a second deflector plate and a contact member. The second deflector plate is in spaced apart relation to the first deflector plate to define a slot between the two deflector plates that is open at the upper end of the deflector arm. The contact member joins the deflector plate at the lower end of each deflector arm. The leading section of the cam-axle and the slot of the leading deflector arm are cooperatively sized and configured such that the leading section is pivotally disposed in the slot of the leading arm. The trailing section of the cam-axle and the slot of the trailing deflector arm are cooperatively sized and configured such that the trailing section is pivotally disposed in the slot of the trailing arm. In the preferred configuration, each of the leading section and the trailing section of the cam-axle have a return spring. The return spring of the leading section interconnects the leading section and the leading deflector arm. The return spring of the trailing section interconnects the trailing section and the trailing deflector arm. In a preferred embodiment, each of the leading section and the trailing section have a spring cavity, with the return spring of the leading section disposed in the spring cavity of the leading section and the return spring of the trailing section disposed in the spring cavity of the trailing section.

Accordingly, the primary object of the present invention is to provide a new mobility device that has the advantages discussed above and which overcomes the various disadvantages and limitations that are associated with presently available mobility devices, including casters and carriage assemblies.

It is also an important objective of the present invention to provide a new mobility device that is structured and arranged to more effectively, efficiently and safely move an object across non-planar areas of a surface, including areas that are uneven or irregular or which have obstructions thereon.

It is also an important objective of the present invention to provide a new mobility device that is stable when moving an object across non-planar areas of a surface, even when the object is supporting very large or heavy objects.

An important aspect of the present invention is that it provides a new mobility device that achieves the various objectives set forth above and elsewhere in the present disclosure.

Another important aspect of the present invention is that it provides a mobility device that effectively, efficiently and safely moves an object across a surface having non-planar areas so as to not be impeded by the non-planar areas and to provide stable movement for the object.

Another important aspect of the present invention is that it provides a mobility device that comprises a walking wheel assembly with at least a forward wheel and a rearward wheel that are interconnected by an offset camshaft that is structured and arranged such that when the forward wheel hits an uneven or irregular area or an obstruction, the forward wheel is driven up over and across the non-planar area while the rearward wheel remains on the planar area of the surface to effectively "walk" over the non-planar area such that the non-planar area will not impede movement of the object.

Another important aspect of the present invention is that it provides a mobility device that is structured and arranged such that a non-planar area of a surface over which the object is being moved will not cause the object to come to a quick stop or be subjected to other action that could result in the object tipping over and throwing the person or items being carried by the object to the ground.

Another important aspect of the present invention is that it provides a mobility device that has a walking wheel assembly, a pedestal and a deflector assembly, with the deflector assembly having a cam-axle, a leading deflector arm and a trailing deflector arm that are structured and arranged to further assist with moving an object over a non-planar area.

Another important aspect of the present invention is that it provides a mobility device that can be joined with like devices to provide a carriage assembly that will allow the user to efficiently and safely move large and/or heavy objects across non-planar areas of a surface.

Yet another important aspect of the present invention is that it provides a mobility device that is relatively inexpensive to manufacture and easy to use for moving objects across a surface.

As will be explained in greater detail by reference to the attached figures and the description of the preferred embodiment which follows, the above and other objects and aspects are accomplished or provided by the present invention. As set forth herein and will be readily appreciated by those skilled in the art, the present invention resides in the novel features of form, construction, mode of operation and combination of processes presently described and understood by the claims. The description of the invention which follows is presented for purposes of illustrating one or more of the preferred embodiments of the present invention and is not intended to be exhaustive or limiting of the invention. The scope of the invention is only limited by the claims which follow after the discussion.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular materials, shapes and configurations for the various components of the new mobility device of the present invention, those persons skilled in the art will readily appreciate that the present invention is not so limited. In addition, the exemplary embodiments of the present device are shown and described with only those components which are required to disclose the present invention. It may be that some of the necessary elements for manufacturing, attaching and using the present invention are not shown or are not necessarily described below, but are well known to persons skilled in the relevant art. As will be readily appreciated by such persons, the various elements of the present invention that are described below may take on any form consistent with forms that are readily realized by persons of ordinary skill in the art having knowledge of mobility devices, including casters and carriage assemblies generally.

Figure 1:
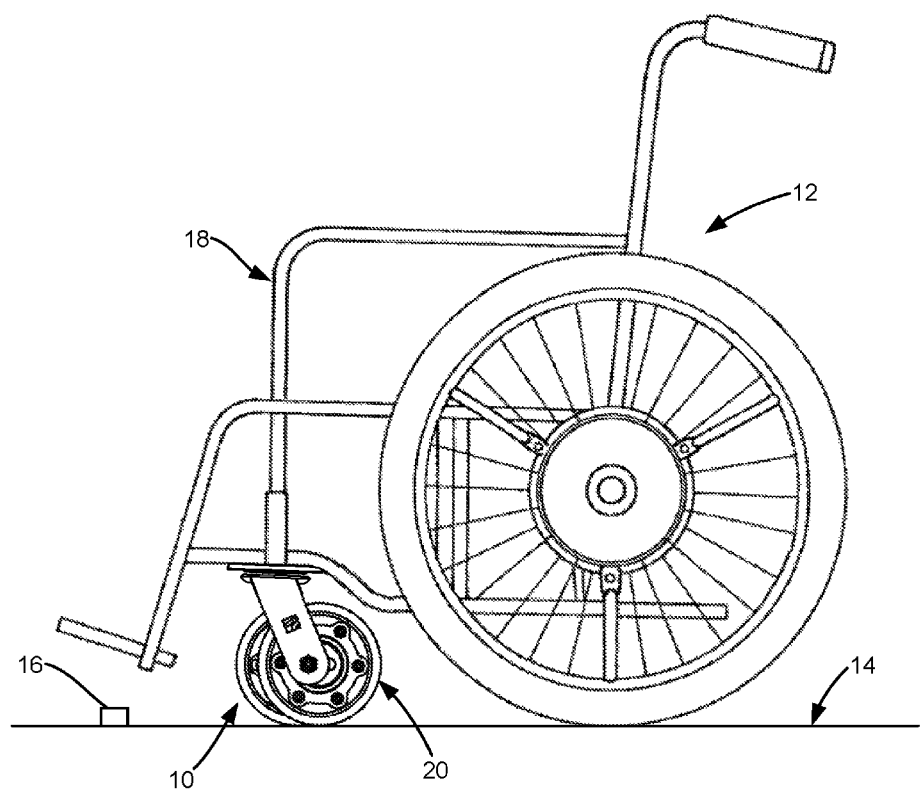
FIG. 1 is a side view of a mobility device configured according to a first embodiment of the present invention as a caster that is shown attached to a wheelchair that is resting on a surface having a non-planar area.
Figure 62:
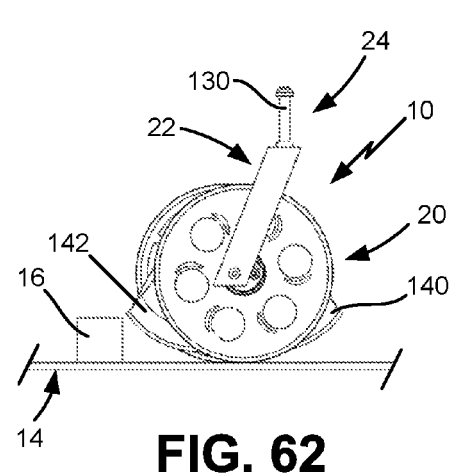
Figure 63:
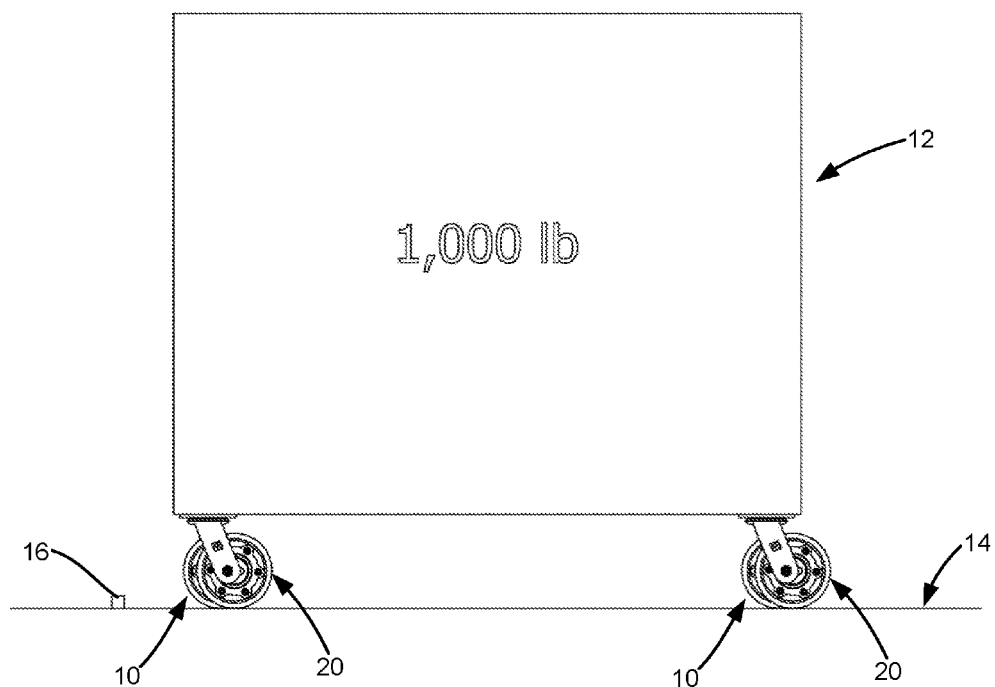
FIG. 63 is a side view of a pair of mobility devices that are configured according to the embodiment of FIG. 1 that are shown attached to a container to move the container across a surface having a non-planar area.

A mobility device that is manufactured out of the components and configured pursuant to various preferred embodiments of the present invention is shown generally as 10 in the figures. As shown with regard to FIG. 1, the mobility device 10 of the present invention is utilized to move an object 12, such as the wheelchair shown in FIG. 1, across a surface 14, such as a floor, sidewalk or the like, that may have a non-planar area 16, which may be an uneven or irregular area or an obstruction. In use, the object 12 will typically comprise or be attached to an object frame 18 that is supported above and usually attached to or integral with a portion of the mobility device 10 to prevent the mobility device 10 from moving relative to (i.e., separating from) the object frame 18. A pair of mobility devices 10 are shown attached to a container, as the object 12, in FIG. 63 to allow a persons to move the object 12 across surface 14 having non-planar area 16. As set forth in the Background, conventional mobility devices, including standard casters and carriage assemblies, commonly have problems moving across a non-planar area 16, particularly when the object 12 is large and/or heavy (such as shown in FIG. 63), and are subject to coming to a sudden stop and then tilting due to the object 12 being generally unstable. As set forth above, with regard to certain objects 12, including objects such as wheelchairs, shopping carts and the like, tilting can result in the person or items being thrown to the surface 14. The mobility device 10 of the present invention solves these problems. In particular, the mobility device 10 of the present invention provides low swivel resistance, low rolling resistance, low obstacle resistance and low shock with relatively high floatation. In preferred configurations of the present invention, the mobility device 10 is robust, stable, economical to manufacture, easy to retro-fit to existing objects 12 and easy to service if needed. The mobility device 10 of the present invention generally comprises an attachment mechanism 19 and a walking wheel assembly 20. The attachment mechanism 19 that attaches the walking wheel assembly 20 to the object 12. As exemplified by the embodiment shown in FIGS. 1-7, 17-18, 21-23, 25-28, 31-32, 35-39, 43-45 and 49-62, the attachment mechanism 19 for the mobility device 10 of the present invention can comprise a caster assembly 21, including a pedestal 22, with the walking wheel assembly 20 configured to move the object 12 across the surface 14 and over or across non-planar areas 16 that are encountered by the mobility object 10. The pedestal 22 of the caster assembly 21 attaches to or can be made integral with the object 12, typically one of the frame components of the object frame 18. In this configuration, walking wheel assembly 20 operatively supports the pedestal 22 and the object 12 above the surface 14 as the mobility device 10 moves the object 12 across surface 14. In a preferred embodiment, the pedestal 22 of the caster assembly 21 removably attaches to the object frame 18 at or near a lower end thereof to moveably support the object 12 as it moves across the surface 14.

Figure 2:
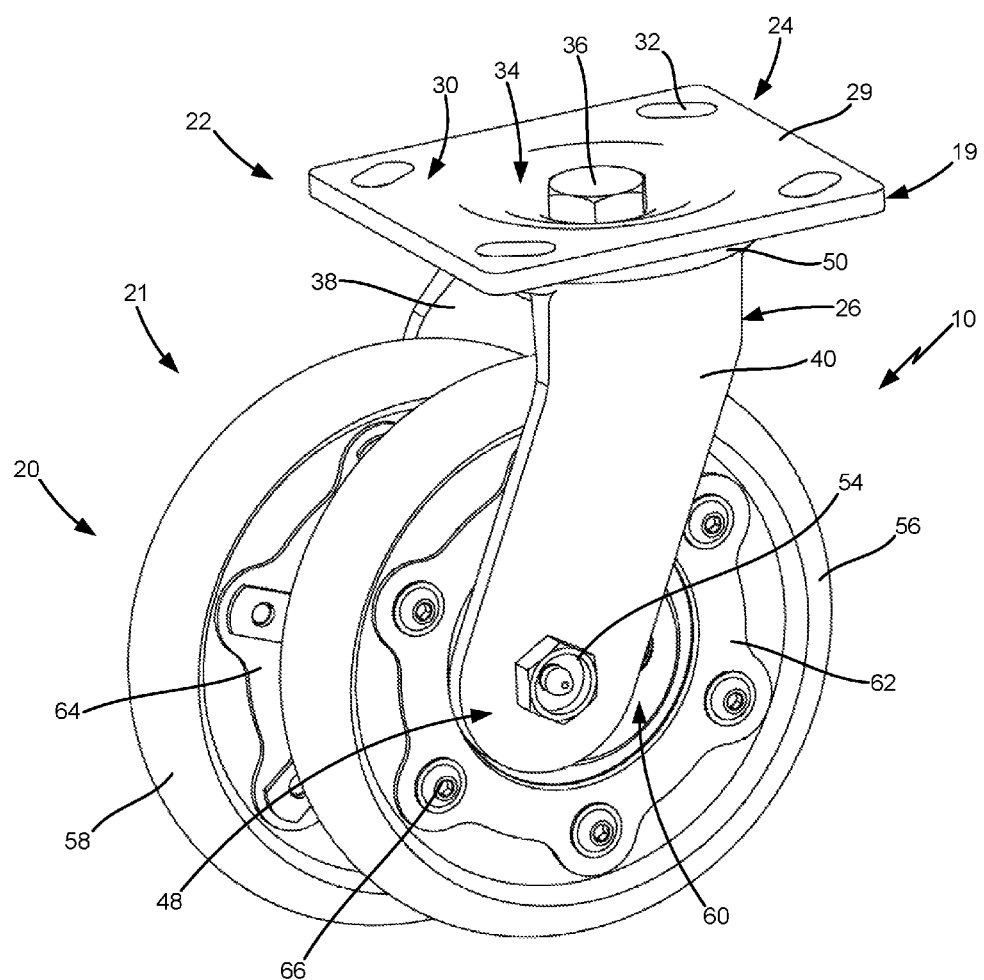
FIG. 2 is a side perspective view of the first side of the mobility device of FIG. 1.
Figure 3:
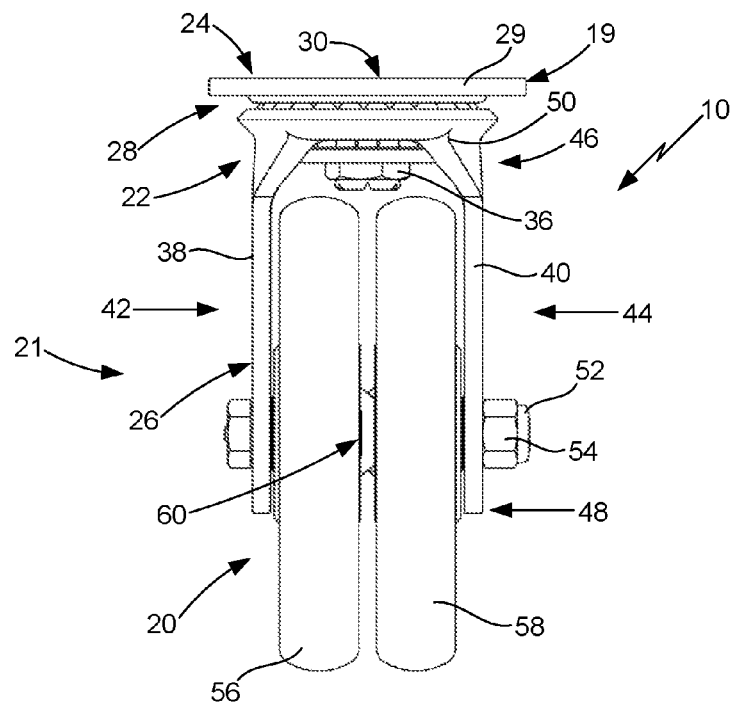
FIG. 3 is a front view of the mobility device of FIG. 2.
Figure 4:
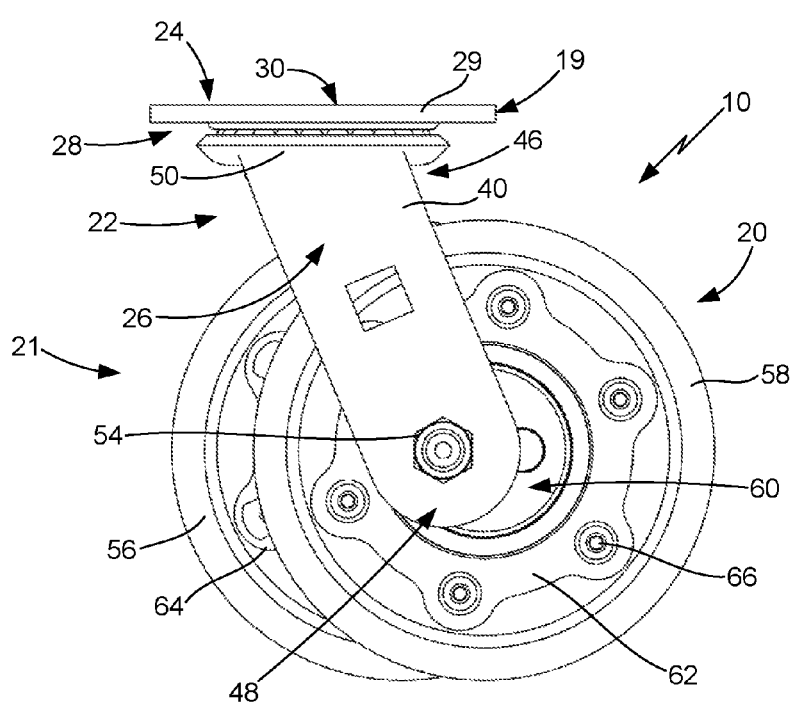
FIG. 4 is a side view of the second side of the mobility device of FIG. 3.

The pedestal 22 generally comprises a mounting device 24 that mounts the mobility device 10 to the object 12, a support frame 26 that connects to the walking wheel assembly 20 and a pivoting mechanism 28 for allowing the support frame 26, and therefore the walking wheel assembly 20, to pivot relative to the mounting device 24, and therefore the object 12. In the embodiment shown in FIGS. 1-4, the mounting device 24 is a mounting plate 29 that defines a mounting surface 30 which engages a component of the object 12, such as object frame 18, when the pedestal 22 is mounted thereto. Typically, as shown in FIGS. 2-4, the mounting plate 29 defines an upwardly disposed mounting surface 30. In one embodiment, shown in FIG. 2, the mounting plate 29 has one or more, typically a plurality, of mounting apertures 32 through the mounting plate 29 that allow the pedestal 22 to be attached to the object 12 using standard removable connectors such as bolts, screws or the like. Alternatively, the mounting plate 29 may be fixedly attached (or substantially fixedly attached) to the object 12 using rivets or the like or by welding the mounting plate 29 to the object 12 (i.e., the object frame 18) or the mounting plate 29 may be made integral with one or more components of the object 12. If desired, the mounting surface 30 can include a concave-shaped recessed area 34 in which a bolt 36 or other connecter, that is utilized to connect the support frame 26 and/or pivoting mechanism 28, is received in order to provide an even mounting surface 30, as best shown in FIG. 3, for attaching the mobility device 10 to the object 12.

The support frame 26 comprises one or more downward extending (when mobility device 10 is mounted to object 12) frame members, shown as the first frame member 38 and second frame member 40 in FIGS. 2 and 3. As best shown in FIG. 3, the first frame member 38 is located generally on the first side 42 of the mobility device 10 and the second frame member 40 is located generally on the second side 44 of the mobility device 10. In the embodiment of FIGS. 25-30, the support frame 26 comprises a single frame member, shown as 38. The frame members 38/40 of support frame 26 must be sufficiently rigid and of sufficient strength to support the anticipated weight of the object 12. Typically, the frame members 38/40 will be made out of metal. Depending on the expected use of the mobility device 10, the frame members 38/40 can be made out of plastic, composites or other materials. The frame members 38/40 have an upper end 46 and a lower end 48, best shown in FIGS. 3 and 4. The upper end 46 of frame members 38/40 (or single frame member 38) define a crown 50 that contains an opening (not shown) through which the bolt 36 is received to secure the pivoting mechanism 28 between the mounting plate 29 and the support frame 26, as best shown in FIGS. 2-4, in a manner which allows the support frame 26 to rotate relative to the mounting plate 29. The lower end 48 of the frame members 38/40 (or single frame 38) has an aperture (not shown) through which an axle bolt 52, which is engaged by a nut 54 (as shown in FIG. 3), is received through the walking wheel assembly 20 to hold, as explained in more detail below, the walking wheel assembly 20 together, as shown in FIGS. 1-4.

As set forth above, the walking wheel assembly 20 of the mobility device 10 of the present invention is structured and arranged to allow a person to move an object 12 across a surface 14 that has one or more non-planar areas 16. The mobility device 10 will traverse the non-planar areas 16 in a manner that significantly reduces the likelihood that a non-planar area 16 will interfere with the movement of object 12 across the surface 14. Specifically, the mobility device 10 will go over or across a non-planar area 16 without being stopped and without loss of stability, which will significantly reduce the risk of tipping the object 12 and dumping a person or items on the surface 14.

Figure 27:
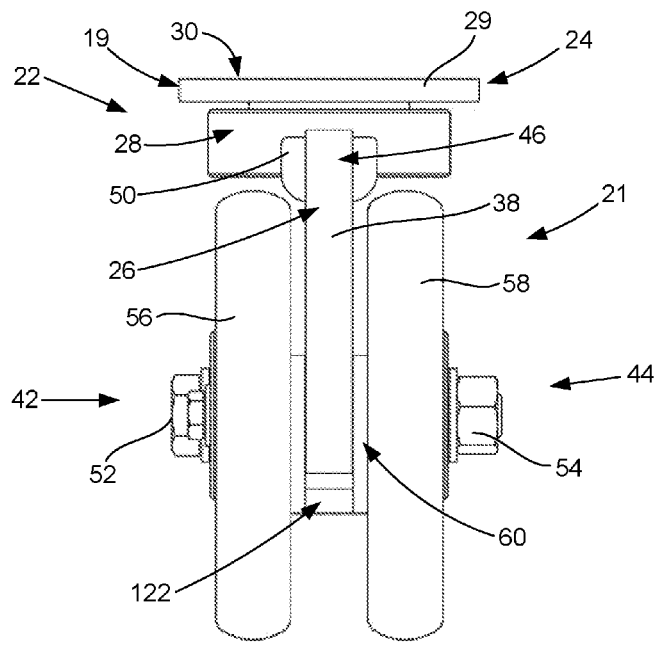
FIG. 27 is a front view of the mobility device of FIG. 25.

The walking wheel assembly 20 comprises two or more wheels, such as first wheel 56 and second wheel 58 in FIGS. 1-4, that are operatively joined by an offset camshaft 60. As set forth above and shown in the embodiment of FIGS. 2 and 3, the wheels 56/58 are disposed between the two frame members 38/40, respectively on the first side 42 and second side 44 of the mobility device 10, or on opposite sides of the single frame member 38, as best shown in FIG. 27. The materials for the wheels 56/58 should be selected to provide the desired moving characteristics for the mobility device 10, such as ease of rolling and swiveling and for its durability, cost and like factors. In one embodiment, the wheels 56/58 are made out of Nylatron® or like materials. If desired, however, the wheels 56/58 can be made out of rubber, plastic, metal or other materials that are commonly utilized for other mobility devices (including casters and the like). The wheels 56/58 will be sized to be beneficial for the intended use of the mobility device 10. In one embodiment, the wheels 56/58 can have a six inch diameter and a one inch width. Naturally, larger or smaller sized wheels 56/58 may be utilized, with the size of the other components (such as the frame members 38/40) being adjusted accordingly.

Figure 10:
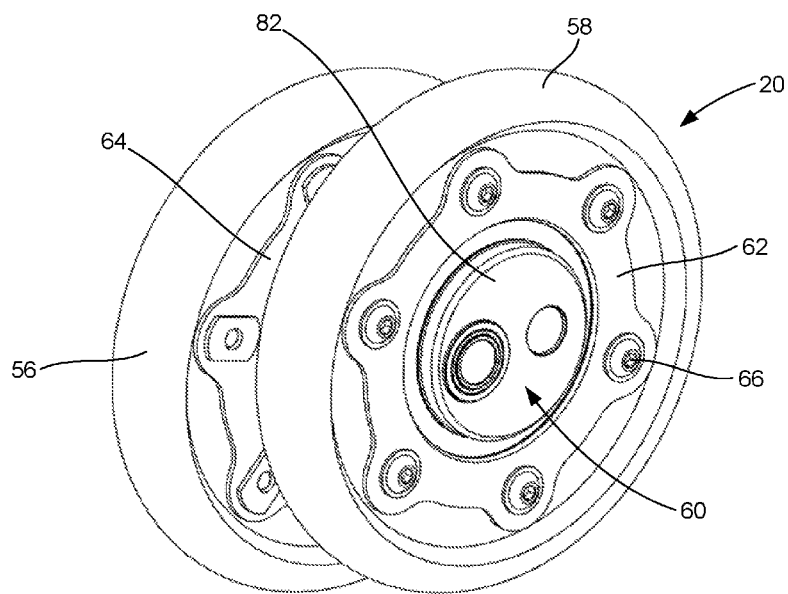
FIG. 10 is a side perspective view of the mobility device of FIG. 2 shown without the pedestal to better illustrate the walking wheel assembly thereof, including the first and second wheels and the offset camshaft.
Figure 11:
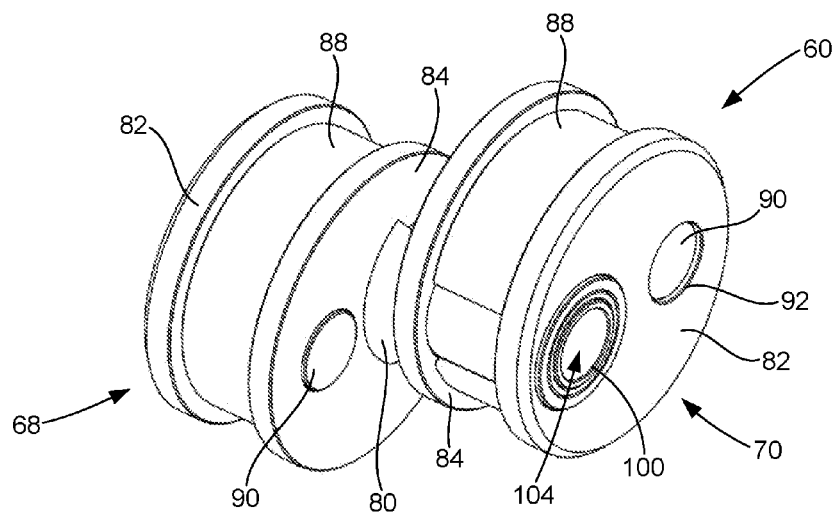
FIG. 11 is a side perspective view of the offset camshaft utilized with the walking wheel assembly

Each of the wheels 56/58 has a pair of support plates, shown as an outer support plate 62 and an inner support plate 64, that are clamped together on opposite sides of each of the wheels 56/58 by connectors 66 to secure the lobes 68/70 of the offset camshaft 60 in the center of each wheel 56/58, as best shown in FIGS. 10 and 11. The offset camshaft 60 is structured and arranged to offset the position of the wheels 56/58 and allow the wheels 56/58 to oscillate over a non-planar area 16, as shown with regard to FIGS. 5-7, to maintain a constant weight distribution over each wheel 56/58. This oscillation significantly improves the capability of dual-wheeled casters, which are generally known to provide low swivel resistance, to provide improved mobility characteristics for the mobility device 10 of the present invention. In a preferred configuration, the offset camshaft 60 is simple to construct and provides simple operation.

Figure 5:
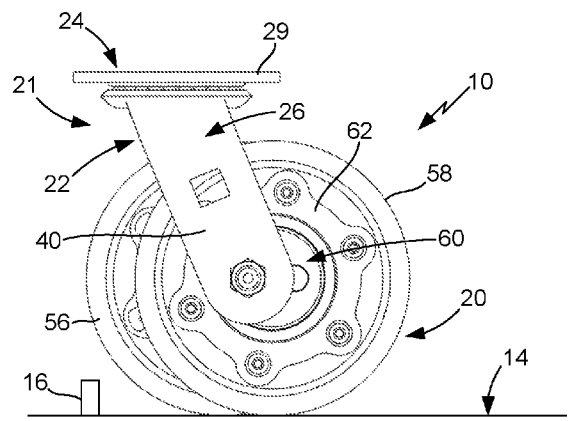
FIG. 5 is the mobility device of FIG. 4 shown on a surface approaching a non-planar area.
Figure 6:
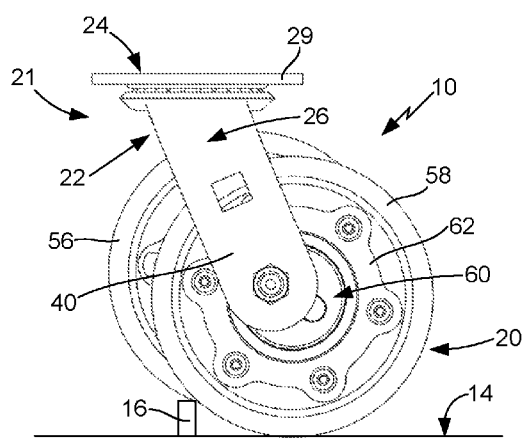
FIG. 6 is a side view of the mobility device of FIG. 5 shown with the first or leading wheel engaging the non-planar area.
Figure 7:
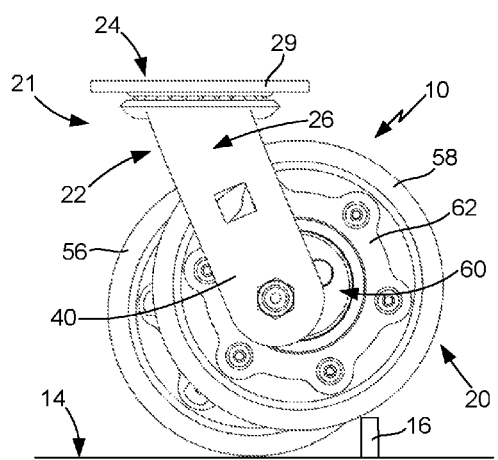
FIG. 7 is a side view of the mobility device of FIG. 6 shown with the second or trailing wheel engaging the non-planar area.
Figure 8:
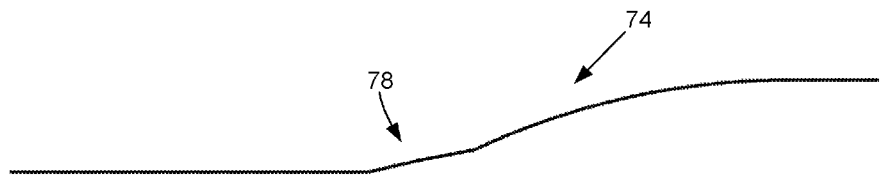
FIG. 8 is a graphical representation showing the new mobility device of the present invention crossing over a non-planar area.
Figure 9:
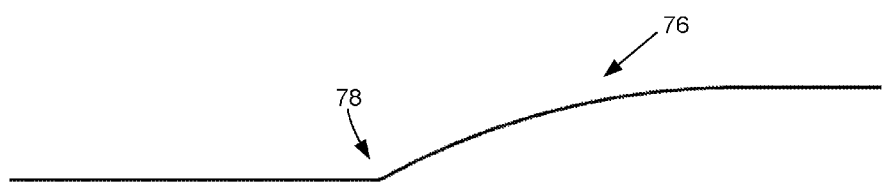
FIG. 9 is a graphical representation showing a prior art mobility device crossing over a non-planar area.

In operation, as shown in FIGS. 5-7, the mobility device 10 rolls along the surface 14 (normally attached to an object 12) that may have a non-planar area 16 thereon, which the mobility device 10 is shown as approaching in FIG. 5. When the leading wheel, which is the first wheel 56 in the embodiment shown in FIGS. 5-7, contacts the non-planar area 16, the first wheel 56 "steps-up" onto the non-planar area 16 while the offset camshaft 60 distributes some of the force to the trailing or second wheel 58 and maintains the second wheel 58 in contact with the surface 14, as shown in FIG. 6. The step-up will slightly raise the object 12. As the second wheel 58 makes contact with the non-planar area 16, it too will "step-up" onto the non-planar area 16 as the first wheel 56 lowers back onto the surface 14, as shown in FIG. 7. If the non-planar area 16 was a ridge leading to a subsequent higher level surface, the first wheel 56 would not lower itself down. Instead, both wheels 56/58 would continue along the now-higher surface 14 at the same level. During the transition on and off the non-planar surface 16, the offset camshaft 60 will rotate to distribute the weight of the object 12 between the two wheels 56/58 to maintain equalized pressure on both the wheels 56/58. Doing so will slightly lift the object 12. The opposing lobes 68/70 equalize the weight that is transferred into the camshaft 60 by the axle bolt 52 (best shown in FIG. 3) that passes through the camshaft 60. The effect of this equalization of the pressure on the wheels 56/58 is illustrated by the graphs of FIGS. 8 and 9. The graph of FIG. 8 shows the travel profile 74 of the mobility device 10 of the present invention shown moving up onto a higher surface 14. The graph of FIG. 9 shows the travel profile 76 of a prior art mobility device moving onto a higher surface 14. In comparing the two travel profile graphs, it will be noted that the transition areas 78 are somewhat different. As will be readily appreciated by persons skilled in the relevant art, the travel profile 74 of the new mobility device 10 provides a much smoother transition area 78 relative to the transition area 78 of the prior art travel profile 76. This smoother transition area 78 will provide increased stability and significantly reduce the likelihood the object 12 will tip over. In addition, a person moving the object 12 using the new mobility device 10 will readily appreciate the ease of which he or she can move the object 12 over the non-planar area 16.

Figure 12:
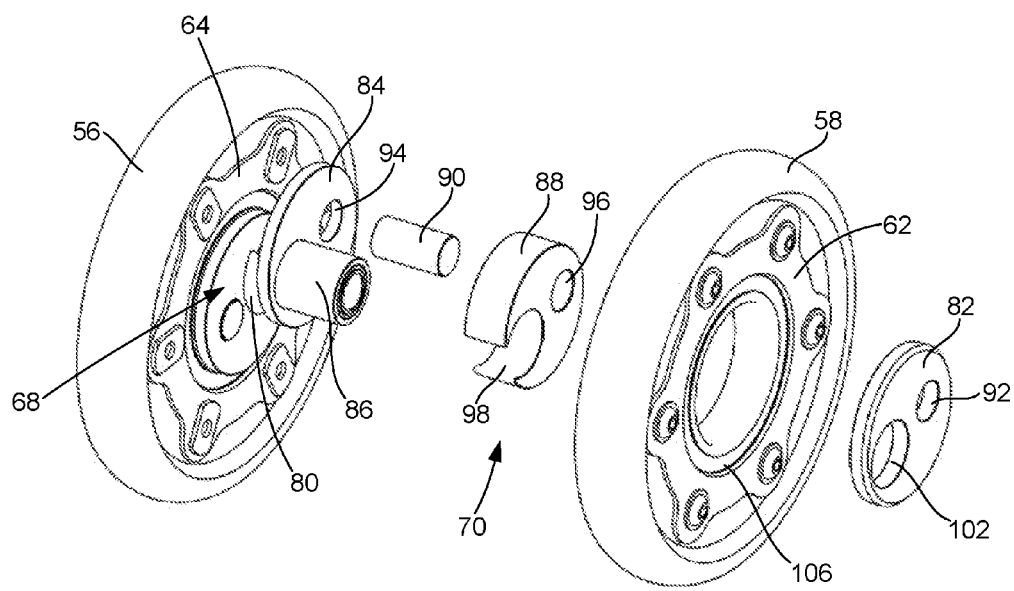
FIG. 12 is a partially exploded side perspective view of the walking wheel assembly of FIG. 10 showing the components of the second lobe of the offset camshaft of FIG. 11.
Figure 13:
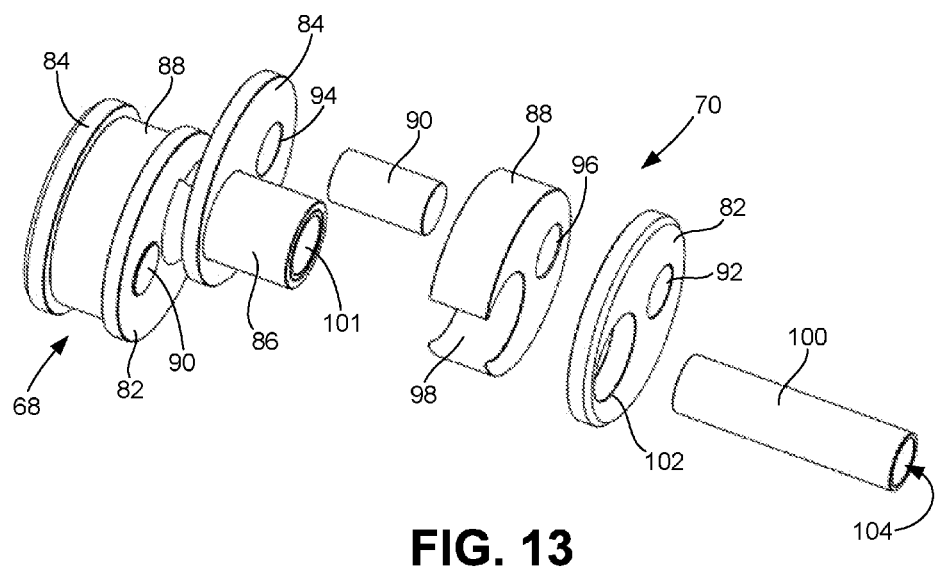
FIG. 13 is a partially exploded side perspective view of the offset camshaft of FIG. 11

As set forth above, the offset camshaft 60 of the walking wheel assembly 20 is structured and arranged to provide the "walking" benefits, namely the ability to easily, efficiently and with less effort move over or across a non-planar area 16 in a manner that provides stability for the object 12, of the mobility device 10 of the present invention, as best shown and described in FIGS. 11-13 for the above embodiment. The opposing first lobe 68 and second lobe 70 are joined by the axle bolt 52 that passes through the two lobes 68/70 and a camshaft bearing 80 disposed between the two lobes 68/70. As best shown in FIGS. 12 and 13, the two lobes 68/70 are formed by a pair of lobe plates, shown as outer lobe plate 82 and inner lobe plate 84 that enclose an lobe tube 86 around which is placed a lobe member 88. A securing pin 90 or the like is utilized to secure the lobe plates 82/84 together with the lobe tube 86 and lobe member 88 disposed therebetween to form a hub or hub-like structure that receives the first wheel 56 (first lobe 68) or the second wheel 58 (second lobe 70), as shown in FIG. 12. The outer lobe plate 82, inner lobe plate 84 and lobe member 88 each have a pin aperture, shown respectively as pin aperture 92, pin aperture 94 and pin aperture 96, through which the securing pin 90 is received to interconnect the outer lobe plate 82, inner lobe plate 84 and lobe member 88, as best shown in FIGS. 12 and 13. A tube engagement opening 98 in the lobe member 88 is sized and configured to receive the lobe tube 86 in a manner that allows the lobe member 88 to pivot relative to the lobe tube 86. In the embodiment of FIGS. 11-13, the lobe tube 86 is welded to the inner lobe plate 84. An elongated sleeve 100 is disposed inside a bearing tube 101, as best shown in FIG. 13, that extends through the lobe tubes 86 and a tube aperture 102, best shown in FIGS. 12 and 13, in the lobe plates 82/84 of the two lobes 68/70. The sleeve 100, which has an internal opening 104 that is sized and configured to receive the axle bolt 52, is sized to slightly extend beyond the face of the outer lobe plate 82 and the inner lobe plate 84 so it can be clamped by the axle bolt 52 (as opposed to clamping against the first lobe 68 and second lobe 70). The offset camshaft 60 provides the opposing lobes 68/70 for the bearings 105 of the two wheels 56/58 so the opposing lobes 68/70 can equalize the weight of object 12 that is transferred into the offset camshaft 60 by axle bolt 52 that connects the walking wheel assembly 20 to the pedestal 22, which is attached to and supports the object 12. The offset camshaft 60 allows the two wheels 56/58 to pivot up and down separately while rotating and causes the wheels 56/58 to move together, forward or backward and left and right, to transfer the weight the object 12 between the two wheels 56/58. This configuration allows the mobility device 10 to easily, smoothly and without much additional force to move over or across a non-planar area 16 of the surface 14 and to do so in a manner which provides stability for the object 12. As set forth above, these features are particularly important when a person or items are being supported by the object 12 and could otherwise be tipped out onto the surface 14 as a result of contact with the non-planar area 16.

Figure 14:
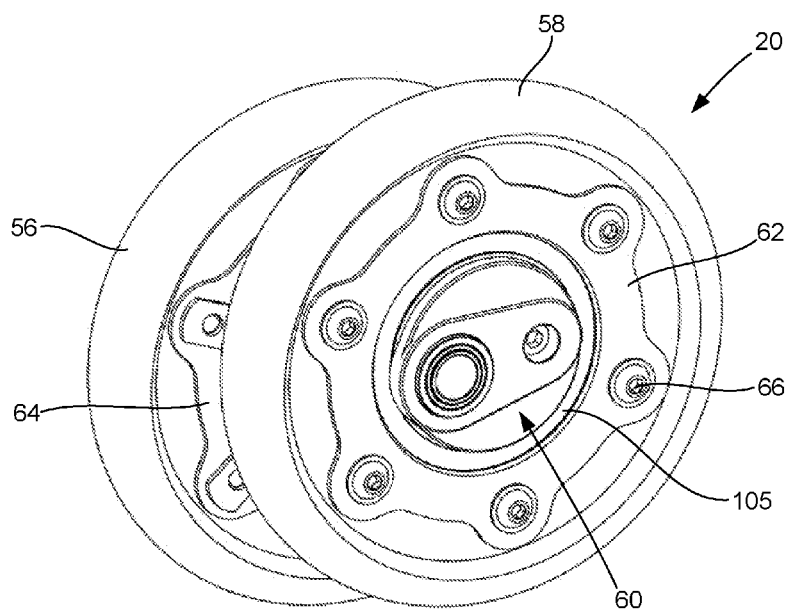
FIG. 14 is a side perspective view of the walking wheel assembly of a second embodiment of the mobility device of the present invention.
Figure 15:
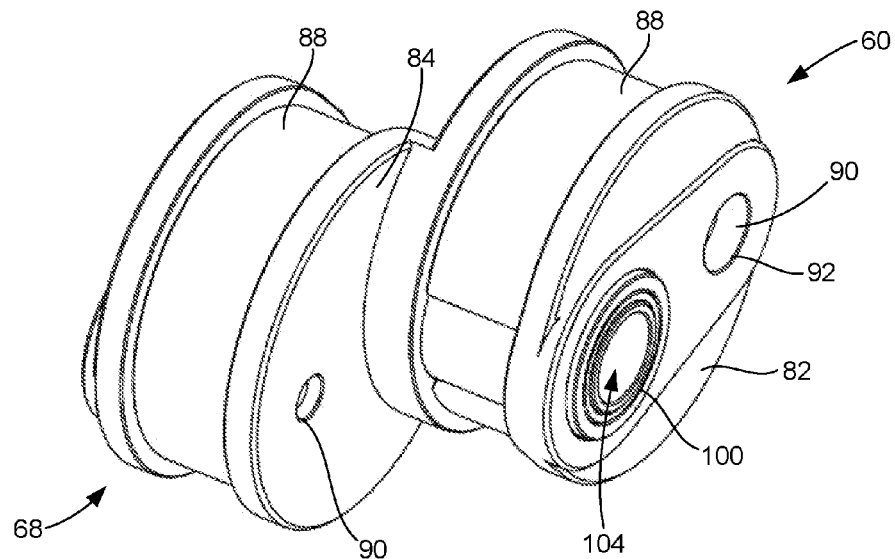
FIG. 15 is a side perspective view of the offset camshaft of the walking wheel assembly of FIG. 14.
Figure 16:
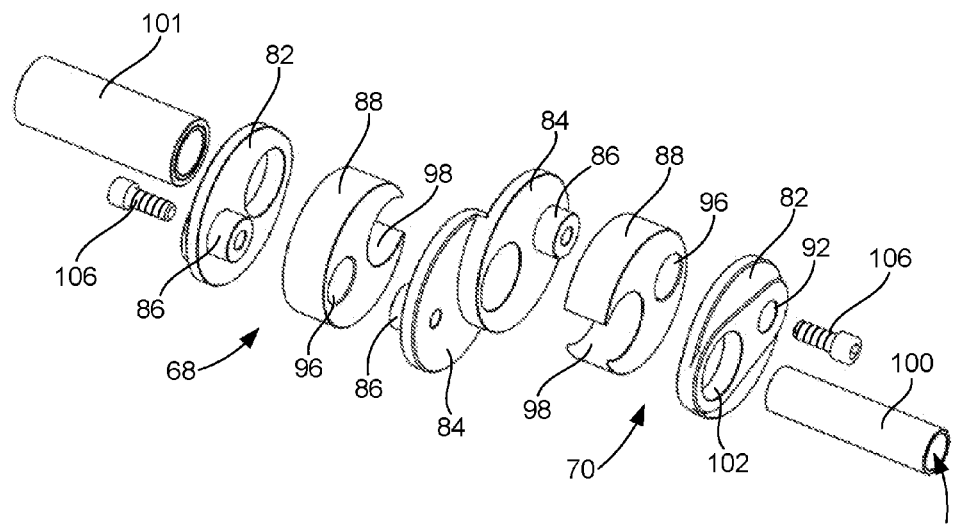
FIG. 16 is an exploded side perspective view of the offset camshaft of FIG. 15.

A walking wheel assembly 20 that can be utilized with a second embodiment of the mobility device 10 of the present invention is shown in FIGS. 14-16. In this embodiment the pedestal 22 portion of the mobility device 10 could be configured and function the same as the pedestal 22 described above with the previous walking wheel assembly 20. Alternatively, different configurations of the pedestal 22 could be utilized with the walking wheel assembly 20 of FIGS. 14-16 (as with the above-described walking wheel assembly 20). In this embodiment, the various components of the offset camshaft 60 are cast, using equipment and processes that are generally well known in the relative art. The exploded view of FIG. 16 shows the use of a sleeve 100 that is received inside the bearing tube 101, which is fixed inside the offset camshaft 60 to rotate with the first lobe 68 and second lobe 70 around the sleeve 100. The sleeve 100 does not rotate. As set forth above, the sleeve 100 has a length to extend beyond the outer faces of the two outer lobe plates 82 on both sides 42/44 of the offset camshaft 60. The sleeve 100 has a slightly smaller diameter than the bearing tube 101 so as to be received therein. The purpose of the bearing tube 101, which may be made out of bronze, aluminum or the like, is to reduce wear on and provide strength for the plastic lobes 68/70. FIG. 16 also shown the use of threaded connectors 106 that are sized and configured to be received through the pin apertures 92/96 of, respectively, the outer lobe plate 82 and the lobe member 88 to threadably engage an aperture in the lobe tube 86 at the inner lobe plate 84.

Figure 17:
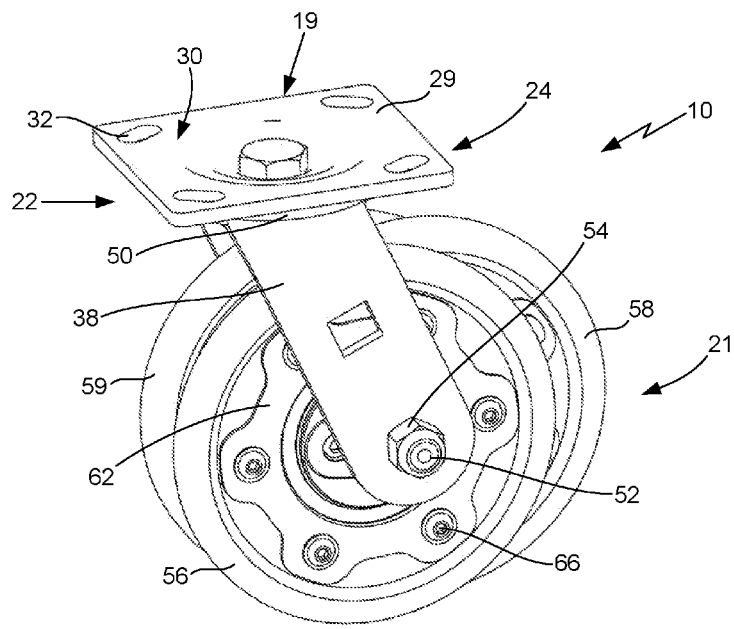
FIG. 17 is a side perspective view of a third embodiment of the mobility device of the present invention showing use of three wheels with the pedestal of the first two embodiments.
Figure 18:
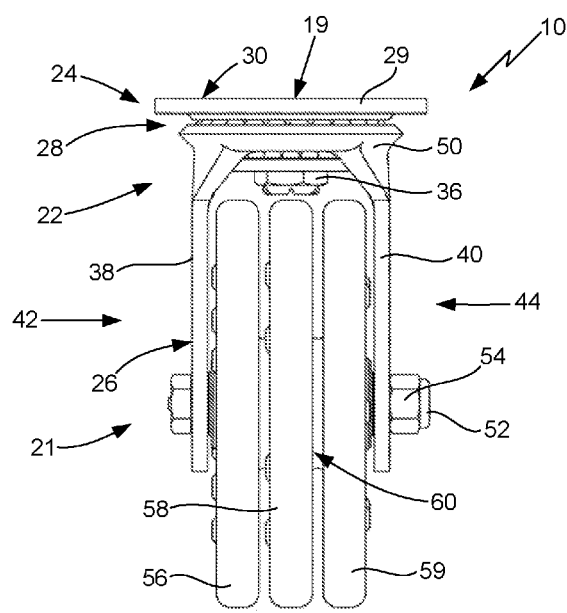
FIG. 18 is a front view of the mobility device of FIG. 17.
Figure 19:
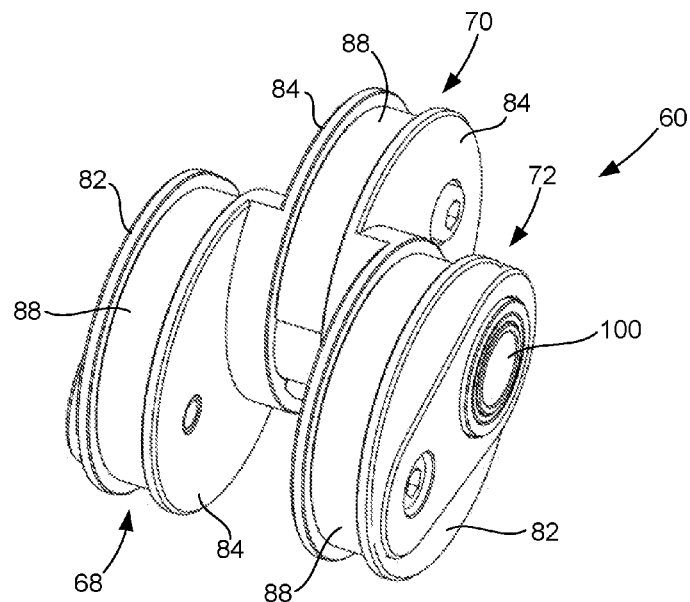
FIG. 19 is a side perspective view of the offset camshaft utilized with the mobility device of FIG. 17.
Figure 20:
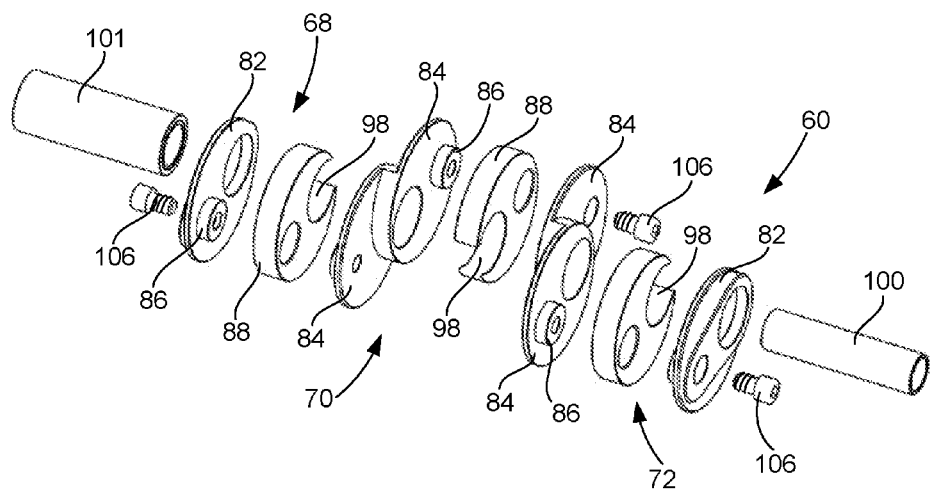
FIG. 20 is a partially exploded side view of the offset camshaft of FIG. 19.
Figure 21:
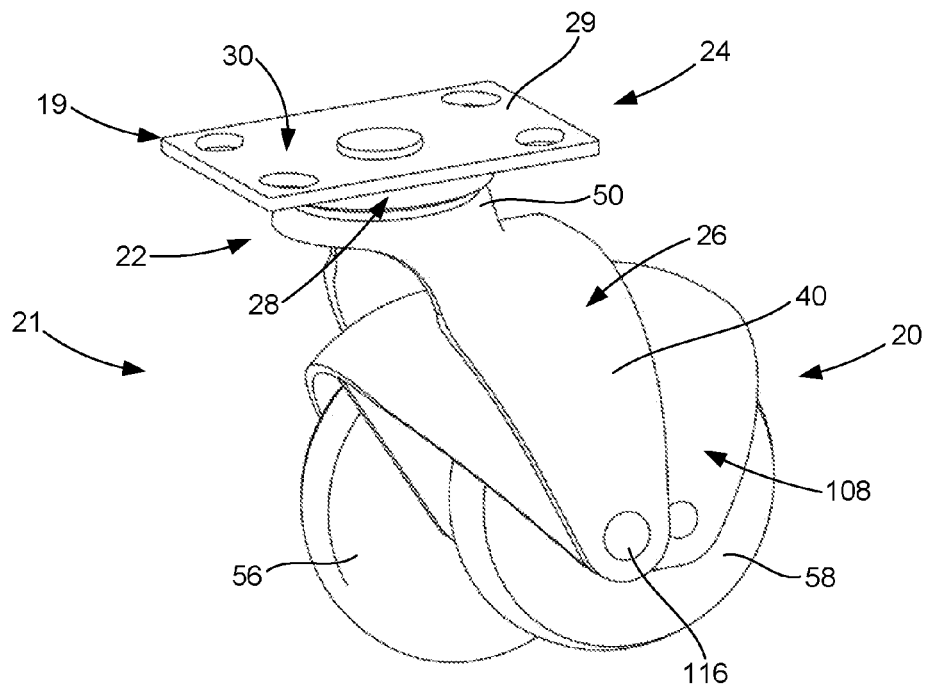
FIG. 21 is a side perspective view of a fourth embodiment of the mobility device of the present invention showing use of semispherical ball wheels with the pedestal of the first three embodiments.

A third embodiment of the mobility device 10 of the present invention is shown in FIGS. 17-20. In this embodiment, the attachment mechanism 19 is also configured as a caster assembly 21 with a pedestal 22. The walking wheel assembly 20, however, has three wheels, first wheel 56, second wheel 58 and third wheel 59 (as best shown in FIGS. 17 and 18) and a differently configured offset camshaft 60 to take into account the three wheels 56/58/59. Although different configurations of pedestal 22 can be utilized with the modified walking wheel assembly 20 (as with the above walking wheel assemblies 20), the pedestal 22 shown in the figures is configured the same as set forth above. In this embodiment, the offset camshaft 60, which is best shown in FIGS. 19 and 20, is structured and arranged to pivotally move the first wheel 56 and the third wheel 59 together, with the second wheel 58 being able to pivot separately from the other two wheels 56/59 when the mobility device 10 encounters a non-planar area 16. To accommodate the third wheel 59, the offset camshaft 60 has a third lobe 72 that acts as the hub for the third wheel 59. In the embodiment of the mobility device 10 shown in FIGS. 17 and 18, the first wheel 56 and the third wheel 59 will, typically, be the leading wheels and the second wheel 58 will be the trailing wheel. Other than having two leading wheels, the mobility device 10 of this embodiment will function the same as the embodiments described above when the mobility device 10 encounters non-planar area 16.

Figure 22:
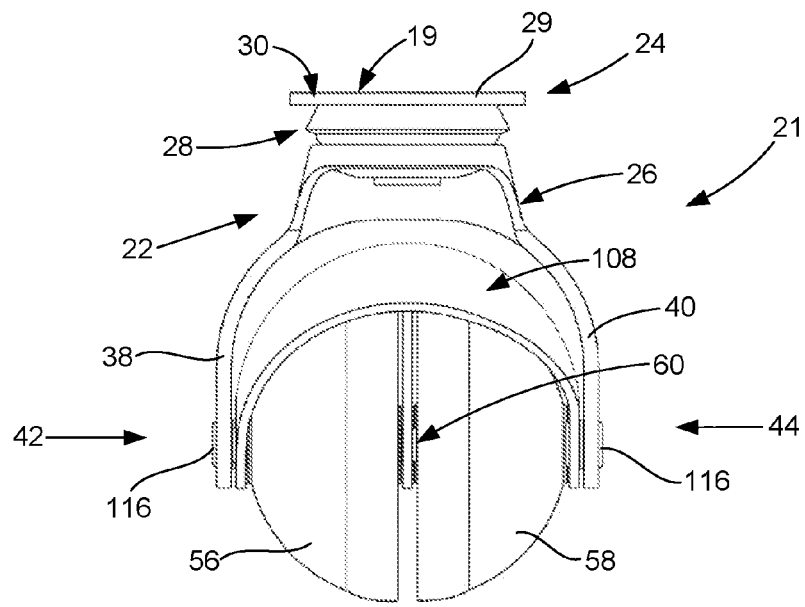
FIG. 22 is a front view of the mobility device of FIG. 21.
Figure 23:
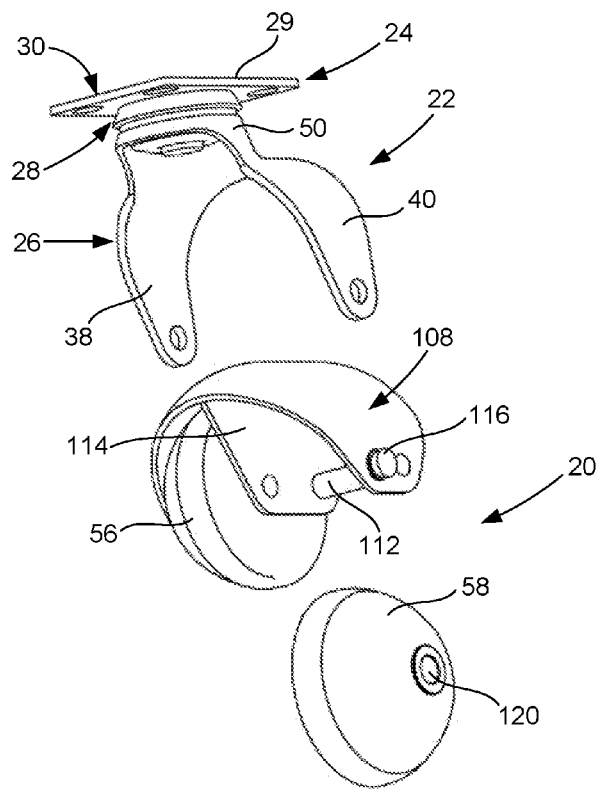
FIG. 23 is a partially exploded side perspective view of mobility device of FIG. 21.
Figure 24:
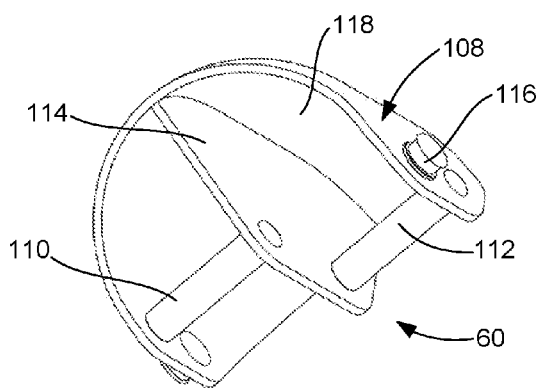
FIG. 24 is a bottom perspective view of the wheel housing of the mobility device of FIG. 23 particularly showing the two axle members.
Figure 25:
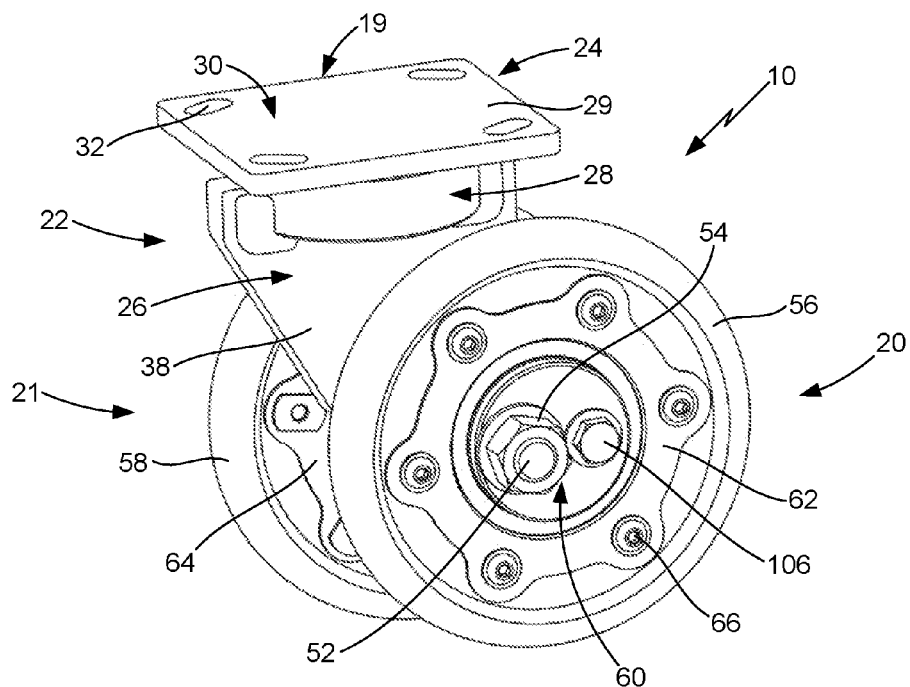
FIG. 25 is a side perspective view of a fifth embodiment of the mobility device of the present invention showing use of a single frame member with the wheels on either side of the frame member.
Figure 26:
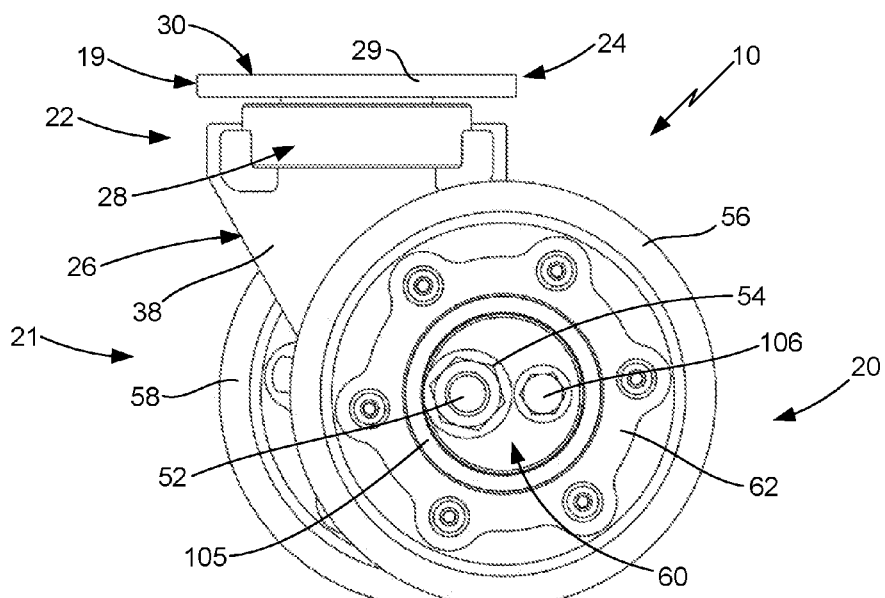
FIG. 26 is a side view of the mobility device of FIG. 25.

A fourth embodiment of mobility device 10 of the present invention is shown in FIGS. 21-24. In this embodiment, the attachment mechanism 21 is also configured as a caster assembly 21. The walking wheel assembly 20, however, has semi-circular shaped ball wheels for the first wheel 56 and second wheel 58 and a differently configured offset camshaft 60 (as best shown in FIGS. 23 and 24) for use with the ball wheels 56/58. In addition, the walking wheel assembly 20 includes a wheel housing 108 that houses the offset axle members 110 and 112 and an axle plate 114 that supports the axle members 110/112. Although different configurations of pedestal 22 can be utilized with the modified walking wheel assembly 20 (as with the above walking wheel assemblies 20), the pedestal 22 shown in the figures is configured generally the same as set forth above (the frame members 38/40 are more arcuately-shaped to take into account the roundness of the ball wheels 56/58). The frame members 38/40 extend downward from the crown 50 of the support frame 26 to engage a pivoting connecting member 116 on each side of the wheel housing 108, as best shown in FIGS. 22 and 24, that is configured to allow the wheel housing 108 to pivot relative to the frame members 38/40 of the support frame 26. The two axle members 110/112 are offset from each other and connect between an interior sidewall 118, best shown in FIG. 24, of the wheel housing 108 and the axle plate 114 that connects to the interior sidewall 118 to divide the area enclosed by the wheel housing 108. The axle members 110/112 connect to the wheels 56/58 through an opening 120, best shown in FIG. 23, in the wheels 56/58. As the mobility device 10 moves along a surface, the offset wheels 56/58, offset due to the position of their respect axle members 110/112, will separately encounter a non-planar area 16 on a surface 14. As each wheel 56/58 moves over or across the non-planar area 16, the walking wheel assembly 20 will pivot the pedestal 22 to more easily, gently and with increase stability move the object 12 along the surface 14 having the non-planar area 16.

Figure 28:
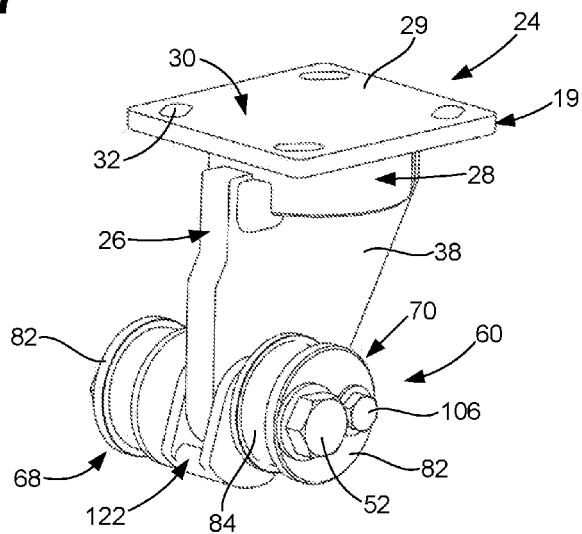
FIG. 28 is a side perspective view of the mobility device of FIG. 25 with the wheels removed from the mobility device to better show the offset camshaft thereof.
Figure 29:
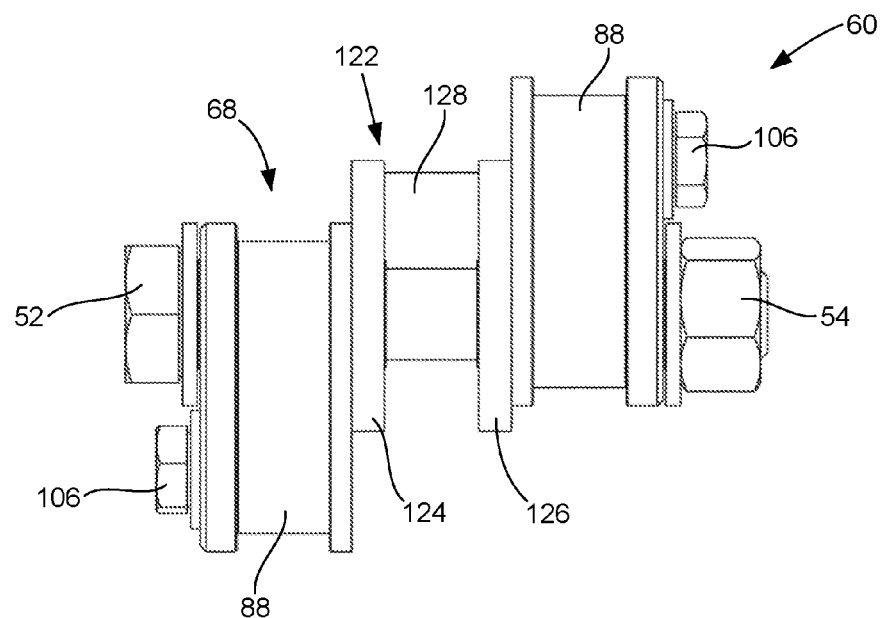
FIG. 29 is a top view of the offset camshaft of FIG. 28 shown separate from the pedestal.
Figure 30:
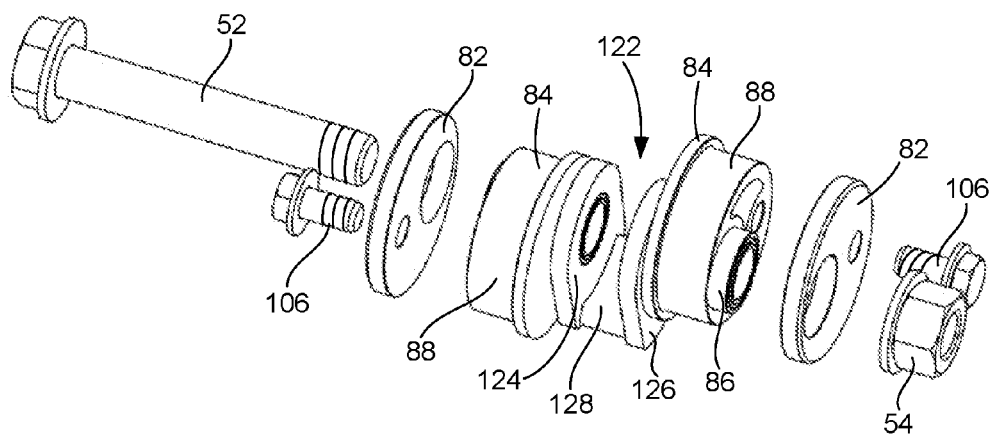
FIG. 30 is a partially exploded side perspective view of the offset camshaft of FIG. 29.

A fifth embodiment of the mobility device 10 of the present invention is shown in FIGS. 25-30. In this embodiment, the attachment mechanism 19 is modified. Specifically, the support frame 26 of the pedestal 22 has only a single frame member, shown as frame member 38. As with the above embodiments, although the mounting device 24 shown in these figures is a mounting plate 29, other types of mounting devices 24 can also be utilized with this embodiment. As set forth in more detail below, the offset camshaft 60 is modified to be utilized with the frame member 38. The crown 50 at the upper end 46 of the single frame member 38 is structured and arranged to securely hold the pivoting mechanism 28 that interconnects the mounting device 24 with the frame member 38. An aperture (not shown) at or near the lower end 48 of the frame member 38 receives the axle bolt 52 to securely attach the walking wheel assembly 20 to the pedestal 22. The wheels 56/58 are located on either side of the frame member 38 and are mounted, as set forth above, on the first lobe 68 and second lobe 70 of the walking wheel assembly 20 by the axle bolt 52. The threaded connectors 106 of each of the lobes 68/70 securely hold the lobe member 88 between the outer lobe plate 82 and the inner lobe plate 84 to define the hub structure where the wheel bearings 105 of the wheels 56/58 are received. A generally U-shaped bracket 122, best shown in FIGS. 28-30, is utilized to interconnect the two opposing lobes 68/70 and the frame member 38. The bracket 122 comprises a pair of side members, shown as 124 and 126, that are connected by a bridge member 128. The bracket 122 is sized and configured to be situated around both sides 42/44 of the frame member 38. In addition, the side members 124/126 must be sized such that there is sufficient clearance between the lower end 48 of the frame member 38 and the bridge member 128 for the cam portion of the offset camshaft 60 to swivel relative to the support member 38. The mobility device 10 of this embodiment provides the same mobility operation and benefits as the other embodiments described above when the mobility device 10 comes across a non-planar area 16 of the surface 14 on which it is moving.

Figure 31:
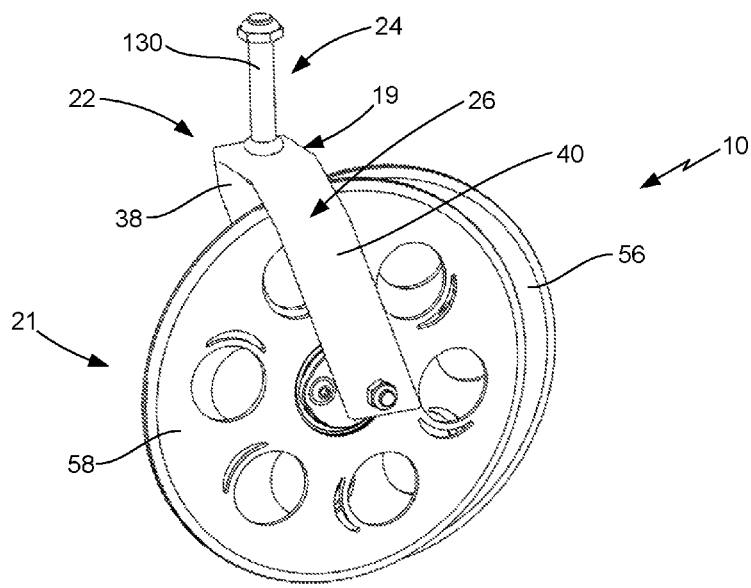
FIG. 31 is a side perspective view of a sixth embodiment of the mobility device of the present invention showing use of a pivot pin as the mounting device of the pedestal.
Figure 32:
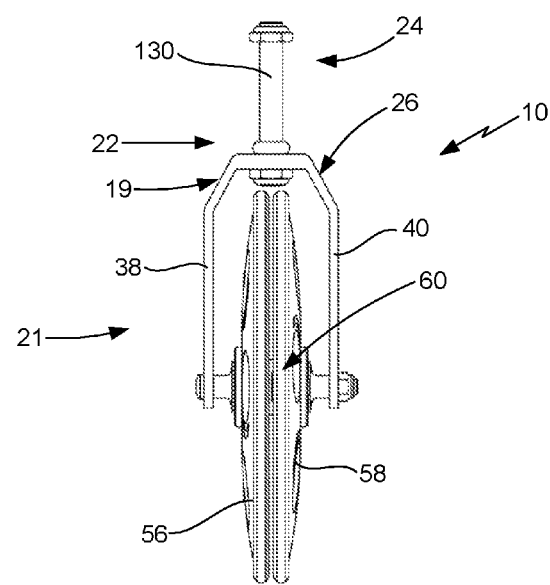
FIG. 32 is a front view of the mobility device of FIG. 31.
Figure 33:
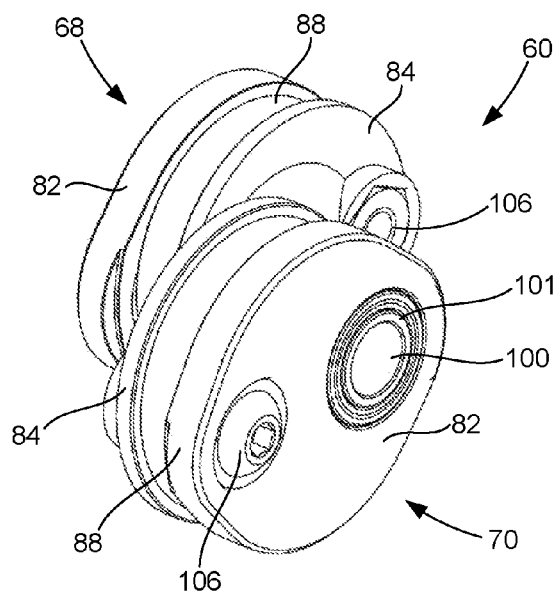
FIG. 33 is a side perspective view of the offset camshaft utilized with the mobility device of FIG. 31.
Figure 34:
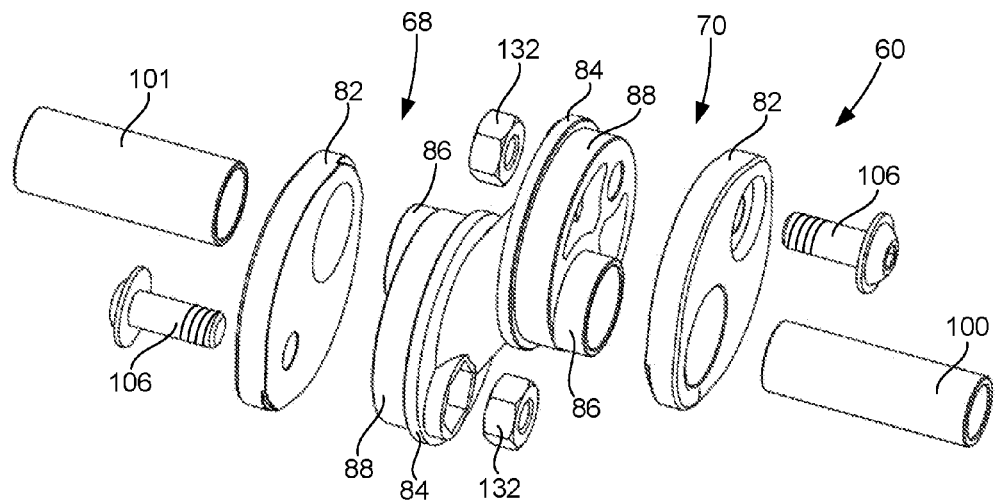
FIG. 34 is a partially exploded side perspective view of the offset camshaft of FIG. 33.
Figure 35:
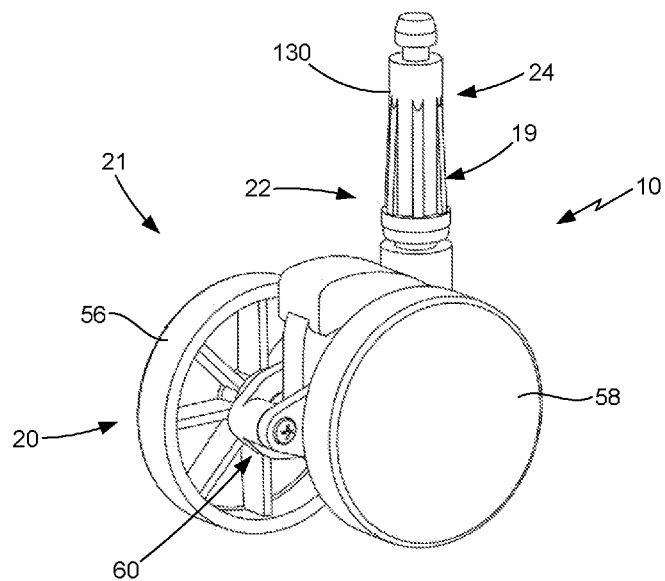
FIG. 35 is a side perspective view of a seventh embodiment of the mobility device of the present invention showing a different configuration for the mounting device, wheels and offset camshaft.
Figure 36:
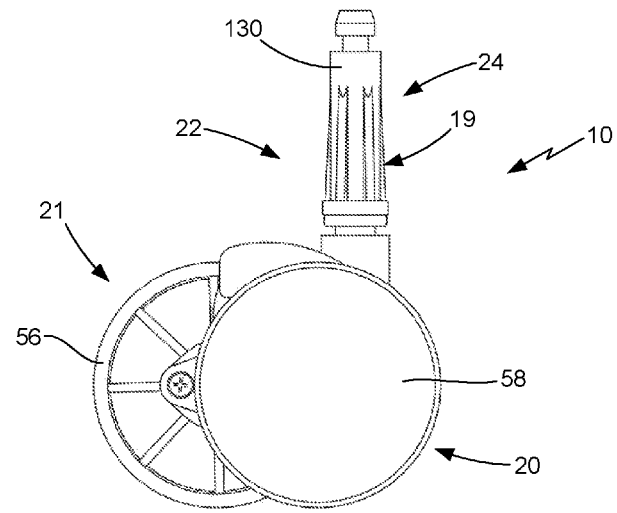
FIG. 36 is a side view of the mobility device of FIG. 35.
Figure 37:
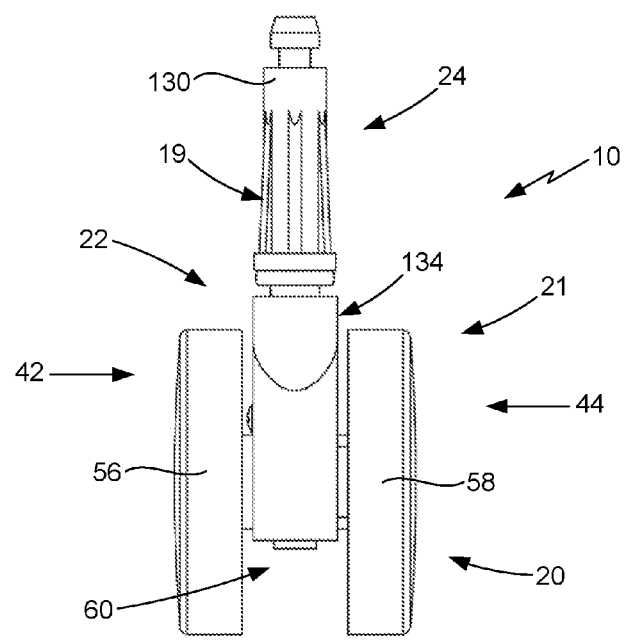
FIG. 37 is a front view of the mobility device of FIG. 35.
Figure 38:
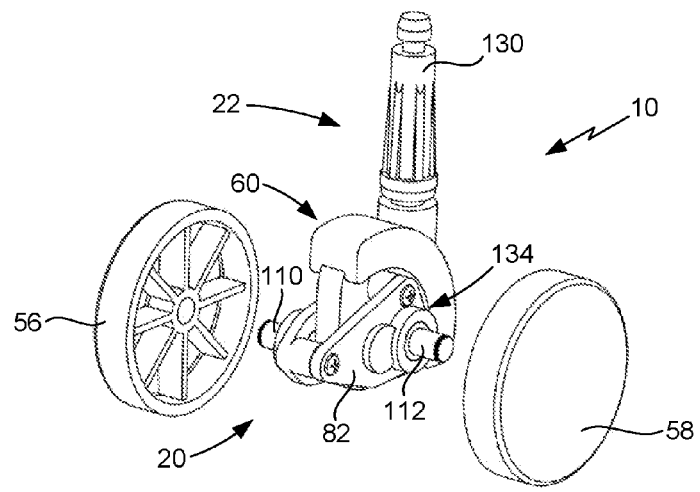
FIG. 38 is a side perspective view of the mobility device of FIG. 35 showing the wheels separate from the walking wheel assembly.

A sixth embodiment of the mobility device 10 of the present invention is shown in FIGS. 31-34. In this embodiment, the attachment mechanism 19 is a modified configuration of a caster assembly 21. Specifically, the mounting device 24 of the pedestal 22 is a pivot pin 130, as shown in FIGS. 31 and 32, that is sized and configured to fit within a cooperatively configured socket 131 (shown in FIG. 41) that is attached to, integral with or otherwise associated with the object 12, often one of the frame members of the object frame 18. The construction, use and operation of a pivot pin/socket combination for a mobility device is generally well known in the relevant art. The lower end of the pivot pin 130 is attached to or integral with the support frame 26, from which the two frame members 38/40 extend downward to connect to the walking wheel assembly 20. The offset camshaft 60 is the same as described above except that the threaded connectors 106 which are utilized to form the lobes 68/70 engage a nut 132 on the back side of the inner lobe plate 84, best shown in FIG. 34. The exploded view of FIG. 34 shows the sleeve 100 that is received inside the bearing tube 101, which is fixed inside the offset camshaft 60 to rotate with the first lobe 68 and second lobe 70 around the sleeve 100. The sleeve 100 does not rotate. As set forth above, sleeve 100 has a length to extend beyond the outer faces of the two outer lobe plates 82 on both sides 42/44 of the offset camshaft 60. The sleeve 100 has a slightly smaller diameter than the bearing tube 101 so as to be received therein. The purpose of the bearing tube 101, which may be made out of bronze, aluminum or the like, is to reduce wear on and provide strength for the plastic lobes 68/70. The mobility device 10 of this embodiment provides the same mobility operation and benefits as the various other embodiments described above when the mobility device 10 comes across a non-planar area 16 of the surface 14 on which it is moving.

Figure 39:
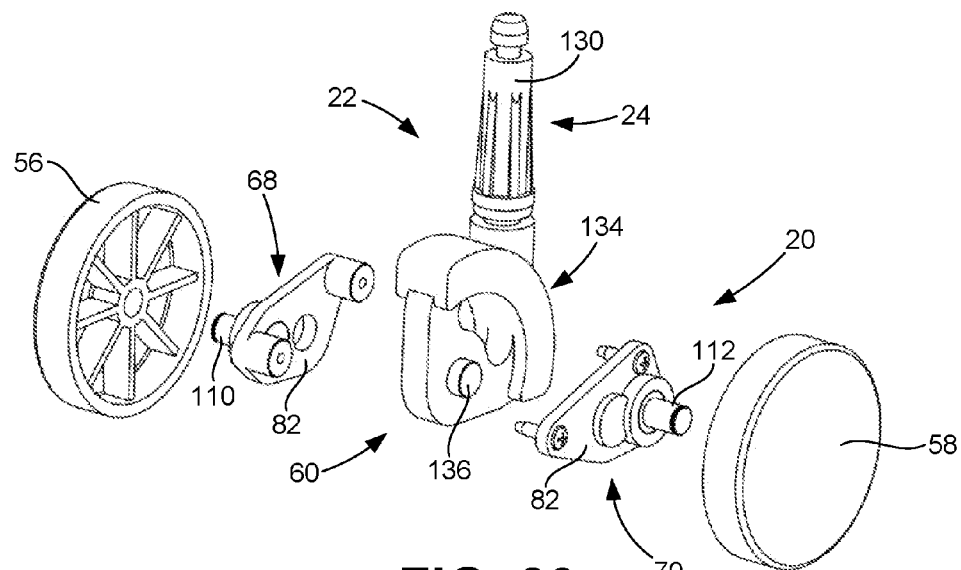
FIG. 39 is a partially exploded side perspective view of the mobility device of FIG. 38 to better show the components of the walking wheel assembly.
Figure 40:
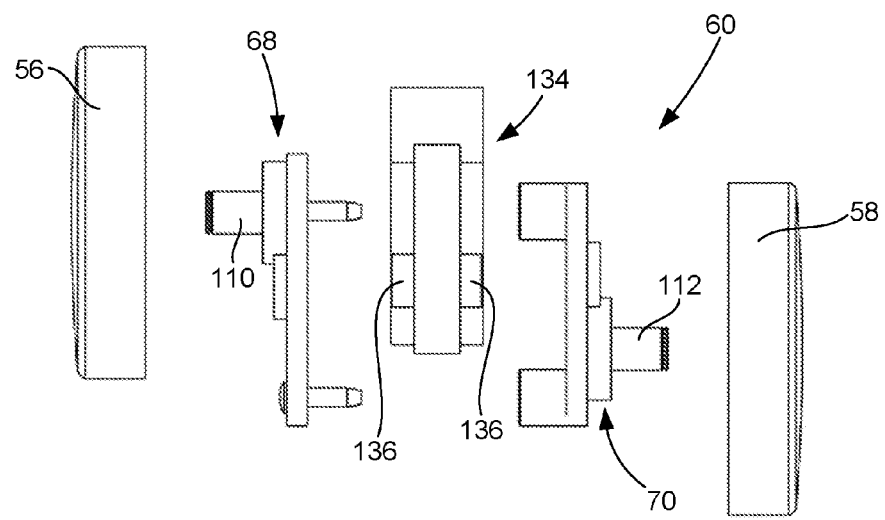
FIG. 40 is a bottom view of the walking wheel assembly of the mobility device of FIG. 39.

A seventh embodiment of the mobility device 10 of the present invention is shown in FIGS. 35-40. In this embodiment, the mounting device 24 is also a pivot pin 130, shown in FIGS. 35-37, albeit with a slightly different configuration than the pivot pin 130 of the previous embodiment. As best shown in FIGS. 35-39, this embodiment also utilizes a different configuration for the wheels 56/58. Like the single frame member embodiment of FIGS. 25-30, this embodiment has the wheels 56/58 on the outer sides of the pedestal 22. The walking wheel assembly 20 has a connecting hub 134 that interconnects the two lobes 68/70. The connecting hub 134 is attached to or integral with the pivot pin 130 and is provided with a pin 136 on each side 42/44 of the connecting hub 134 that operatively engages the two lobes 68/70, as best shown in FIGS. 39 and 40. The pins 136 allow the lobes 68/70 to pivot independent of each other, which will pivot the wheels 56/58, when the mobility device 10 needs to traverse a non-planar area 16 when it is moving along the surface 14. Each of the two lobes 68/70 has an axle member 110/112 associated therewith that engages the respective wheel 56/58 in a manner that allows the wheels 56/58 to rotate on the surface 14. When the leading wheel (i.e., wheel 58 in FIG. 36) of wheels 56/58 hits a non-planar area 16, the leading wheel 58 will pivot to raise above or cross over the non-planar area 16 while the trailing wheel 56 remains on the surface 14. The offset camshaft 60 will transfer the weight of the object 12, and anything or anyone on or in the object 12, to equalize the weight between the two wheels 56/58, which will provide the same mobility operation and benefits as the various other embodiments described above.

Figure 41:
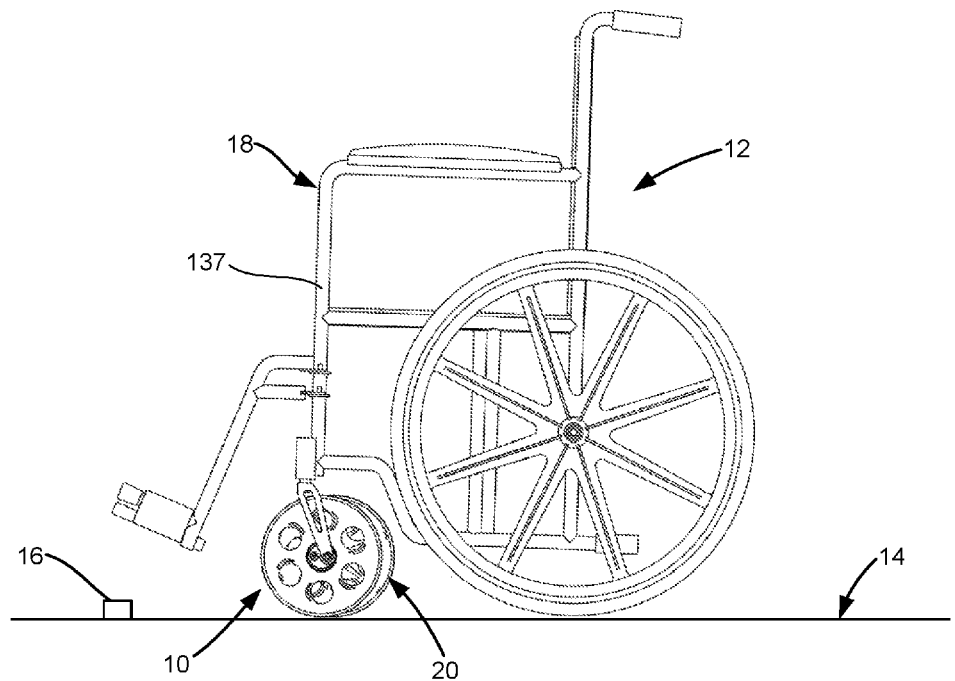
FIG. 41 is a side view of a mobility device configured according to an eighth embodiment of the present invention shown attached to a wheelchair that is resting on a surface having a non-planar area.
Figure 42:
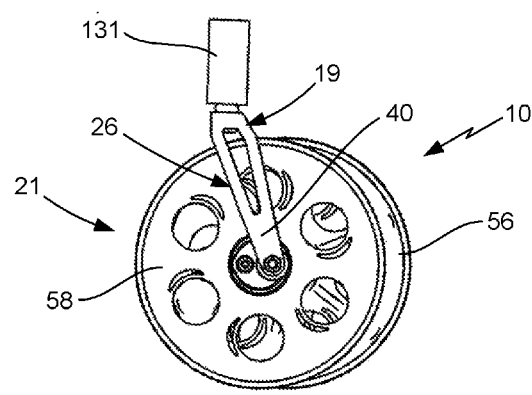
FIG. 42 is an isolated front view of the mobility device of FIG. 41 and the socket component of the wheelchair where the mobility device attaches.

An eighth embodiment of the mobility device 10 of the present invention is shown in FIGS. 41 and 42. In this embodiment, the mobility device 10 is engaged with a socket 131 that is attached to, integral with or otherwise associated with one or more of the frame members 137 of the object 12 using a pivot pin 130 (as shown in FIG. 31). In this manner, the wheels 56/58 and the offset camshaft 60 will rotate relative to the frame 18 of object 12 or the object 12 itself (i.e., with regard to FIG. 63). If desired, the attachment mechanism 19 may have a pair of spaced apart frame members 38/40 of the support frame 26 that are configured as a fork with the offset cam shaft 60 and wheels 56/58 between the frame members 38/40 (similar to what is shown in FIG. 31). As with the previous embodiments, when the leading wheel (i.e., wheel 58 in FIG. 42) of wheels 56/58 hits a non-planar area 16, the leading wheel 58 will pivot to raise above or cross over the non-planar area 16 while the trailing wheel 56 remains on the surface 14. The offset camshaft 60 will transfer the weight of the object 12, and anything or anyone on or in the object 12, to equalize the weight between the two wheels 56/58 to provide the mobility operation and benefits as set forth with the various other embodiments described above.

An ninth embodiment of the mobility device 10 of the present invention is shown in FIGS. 41-60. In this embodiment, attachment mechanism 19 is configured as a caster assembly 21 with the mounting device 24 being a pivot pin 130, shown in FIGS. 43-45, that is configured at least generally the same as the pivot pin 130 of the sixth embodiment (as shown in FIGS. 31-32). As best shown in FIGS. 43-48, the mobility device 10 of this embodiment utilizes a new deflector assembly 138 to assist the castor 10 with crossing over, moving onto or otherwise traversing a non-planar area 16 on, attached to or associated with the surface 14 on which the castor 10 is moving an object 12, such as shown in the sequence of drawings of FIGS. 49-62. The deflector assembly 138 of this embodiment comprises a pair of deflector arms, shown as a leading deflector arm 140 and trailing deflector arm 142, and a cam-axle 144, as best shown in FIGS. 45-48. As described above, the terms "leading" and "trailing" utilized with the present invention are referenced with regard to the direction of travel, with the leading deflector arm 140 being on the side of mobility device 10 that is the direction of travel and the trailing deflector arm 142 being on the opposite side of the mobility device 10. As will be readily appreciated by those skilled in the art, the use of the deflector assembly 138 is particularly useful for overcoming high non-planar areas 16.

Figure 45:
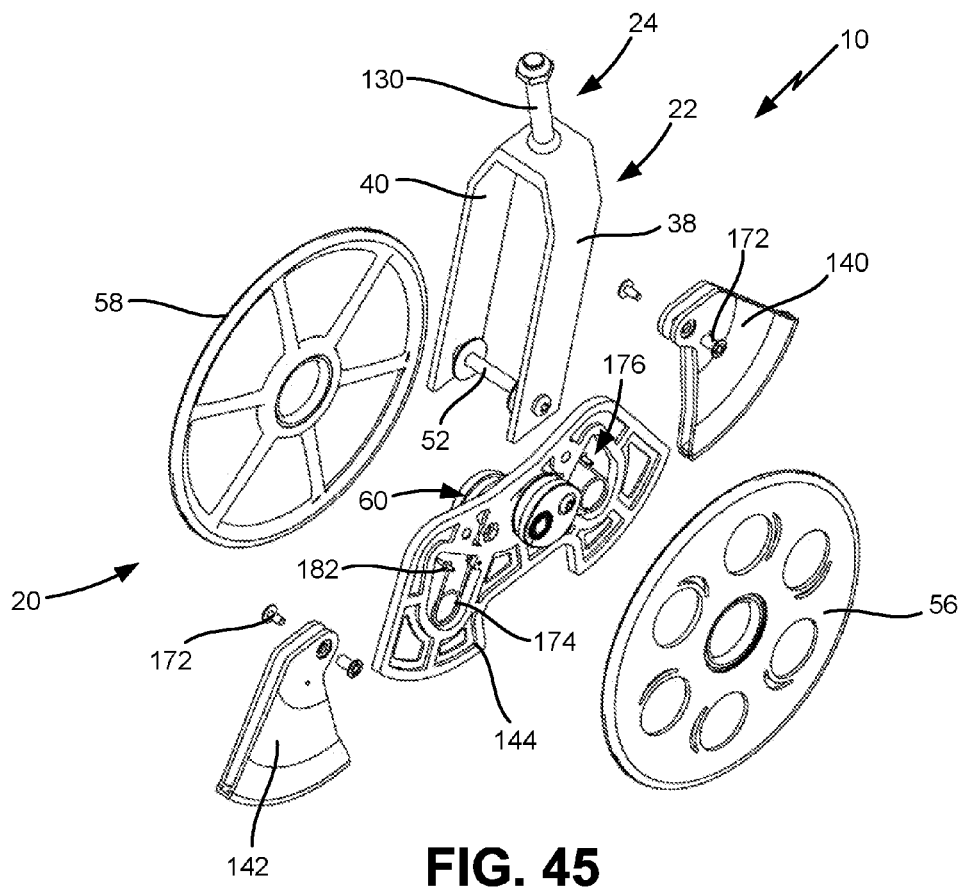
FIG. 45 is an exploded view of the mobility device of FIG. 43.
Figure 46:
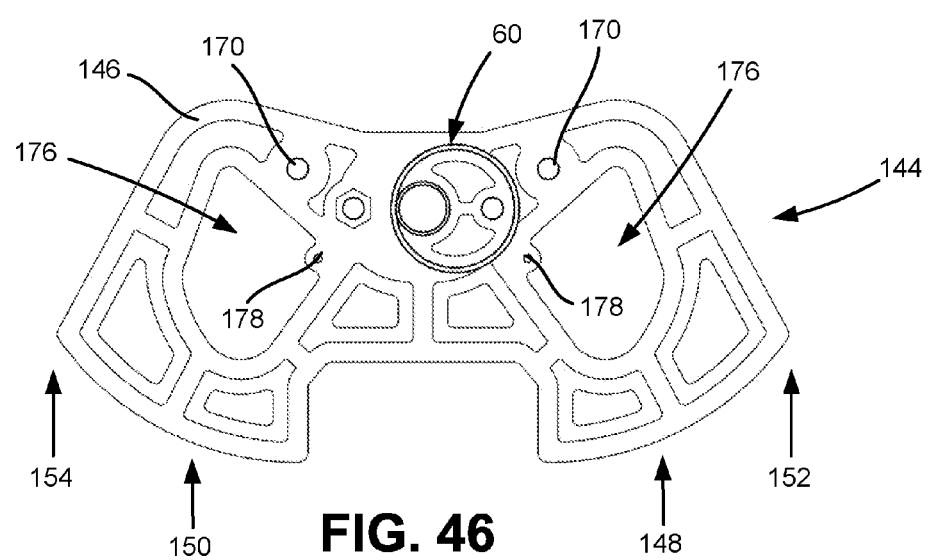
FIG. 46 is a side view of the cam-axle that is utilized with the mobility device shown in FIG. 45.
Figure 47:
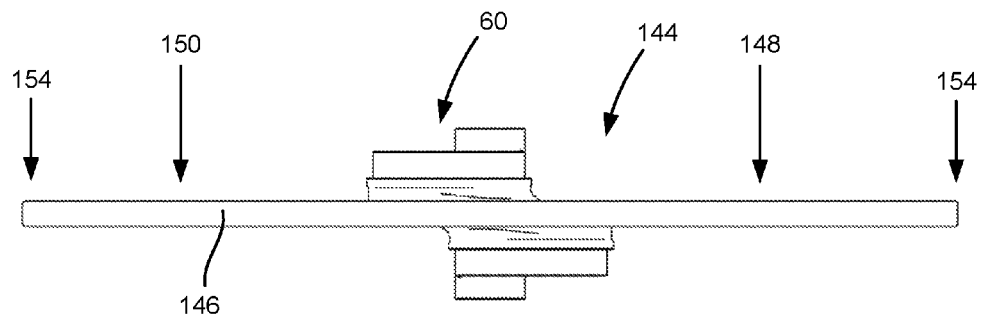
FIG. 47 is a top view of the cam-axle of FIG. 46.
Figure 48:
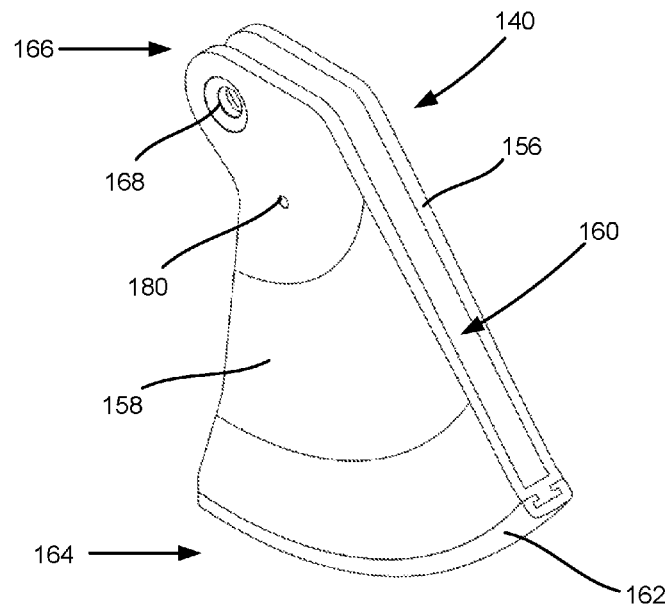
FIG. 48 is a side perspective view of one of the deflector arms of the mobility device of FIG. 45.

The cam-axle 144 attaches to or is made integral with the offset camshaft 60, as best shown in FIGS. 46 and 47, that is attached to the pedestal 22 by the axle bolt 52 that interconnects the first frame member 38, second frame member 40 and offset camshaft 60, as best shown in FIG. 45. The cam-axle 144 has a frame 146 that is structured and arranged with substantially matching leading section 148 and trailing section 150, shown in FIGS. 46 and 47, that are generally positioned, respectively, toward the leading end 152 and trailing end 154 of the cam-axle 144. The frame 146 of each of the leading section 148 and trailing section 150 are configured to achieve the various benefits of the deflector assembly 138 of the present invention, namely improved movement across or over a non-planar area 16. Each of the deflector arms 140/142 have a pair of spaced apart deflector plates, shown as first deflector plate 156 and second deflector plate 158, that define a deflector slot 160 disposed between the two plates 156/158 that is closed with a contact member 162 at the lower end 164 of the deflector arms 140/142 and open at the upper end 166, as best shown in FIG. 48. The deflector slot 160 of the deflector arms 140/142 and the frame 146 of the cam-axle 144 are cooperatively sized and configured so the deflector arms 140/142 will pivot relative to the frame 146 with the frame sections 148/150 being disposed in and through the deflector slot 160, as shown in the sequence of drawings in FIGS. 49-62.

The contact member 162 at the lower end 164 is selected to join the two deflector plates 156/158 at the lower end 164 of each of the deflector arms 140/142 and to contact the surface 14 and non-planar area 16 as the mobility device 10 is utilized to move the object 12 across the surface 14. In the embodiment shown in the figures, the contact member 162 is in an interlocking engagement with the two deflector plates 156/158.

Figure 43:
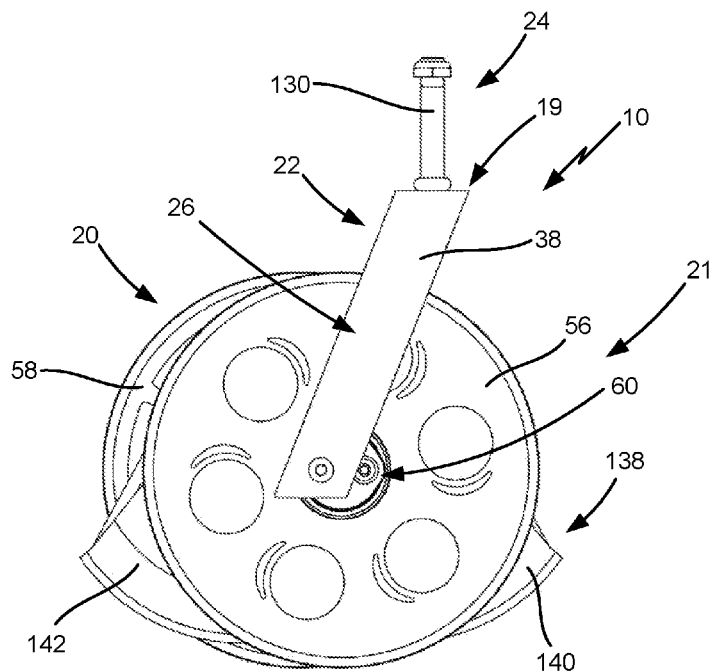
FIG. 43 is a side view of a ninth embodiment of the mobility device of the present invention showing use of deflector arms with the walking wheel assembly thereof.
Figure 44:
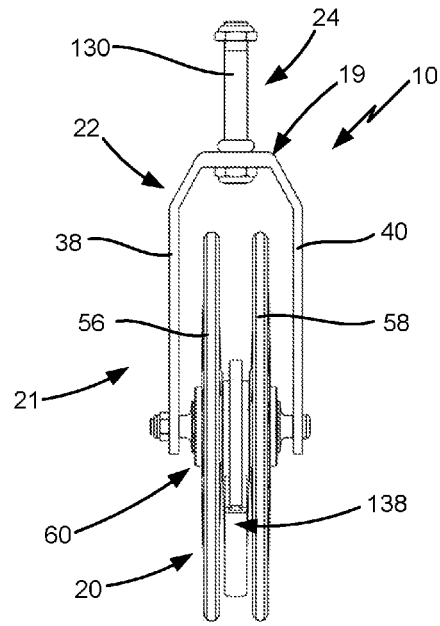
FIG. 44 is a front view of the mobility device of FIG. 43.
Figure 49:
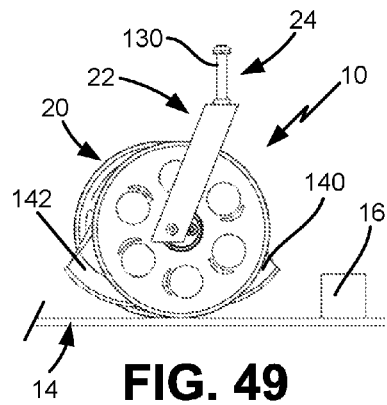
FIGS. 49-62 are side views of the mobility device of FIG. 43 showing the mobility device having deflector arms moving across a surface as it encounters and then traverses a non-planar area on the surface.

As set forth above, each of the deflector arms 140/142 are pivotally attached to the cam-axle 144 so they may both pivot relative to the cam-axle 144, with the leading deflector arm 140 pivotally connected to and pivoting relative to the leading section 148 and the trailing deflector arm 142 pivotally connected to and pivoting relative to the trailing section 150. In the embodiment shown in the figures, the deflector arms 140/142 each have a pivot aperture 168 generally at the upper end 166 thereof and the cam-axle 144 has a corresponding pivot aperture 170 that are each sized and configured to receive a pivot connector 172 that pivotally connects the deflector arms 140/142 to the cam-axle 144. The pivoting of the deflector arms 140/142 relative to cam-axle 144, to which the two deflector arms 140/142 are attached, will assist the walking wheel assembly 20 with moving across or over the non-planar area 16 by helping lift (or pre-lift) the leading wheel, such as wheel 56 in FIGS. 49-62, over the non-planar area 16, and help control the descent from, or movement off of, the non-planar area 16 by the trailing wheel, such as wheel 58 in FIGS. 49-62. To pull the deflector arms 140/142 back to their "neutral" location, such as shown in FIGS. 43, 49 and 62, after traversing the non-planar area 16, the deflector assembly 138 includes a return spring 174 that is disposed in a spring cavity 176 of each of the leading section 148 and trailing section 150 of the cam-axle 144, as shown in FIGS. 45 and 46. The return spring 174 interconnects the cam-axle 144, at a spring bore 178 in the frame 146 generally next to the spring cavity 176 (as best shown in FIG. 46), and a spring bore 180 through the deflector plates 156/158 of the two deflector arms 140/142 (as best shown in FIG. 48) utilizing spring pins 182 or other spring connectors.

Figure 50:
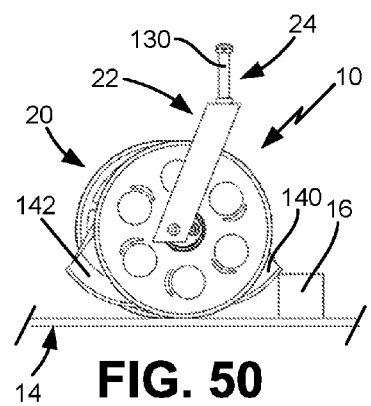
Figure 51:
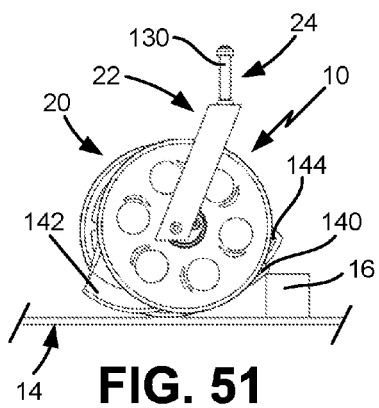
Figure 52:
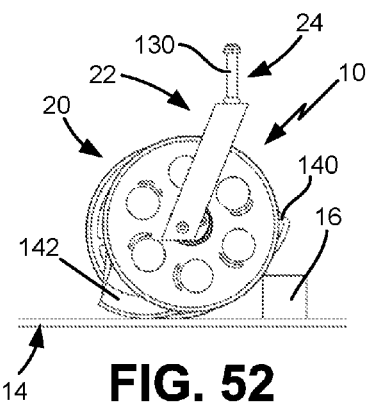
Figure 53:
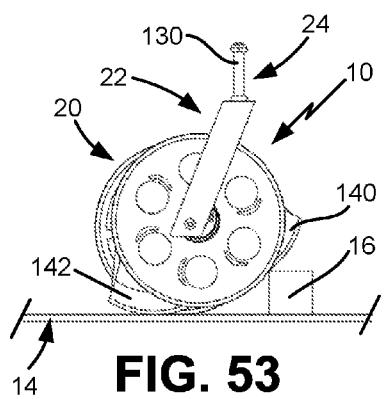

The movement of a mobility device 10 with a walking wheel assembly 20 having the above-described deflector assembly 138 as it moves across a surface 14 having a non-planar area 16 is shown in FIGS. 49-62. In these figures, the direction of travel for the mobility device 10 is left to right, with the leading deflector arm 140 shown approaching the non-planar area 16 first in FIG. 49. Both the leading deflector arm 140 and trailing deflector arm 142 are in their neutral positions as the wheels 56/58 of the walking wheel assembly 20 move in a forward direction along the surface 14. In FIG. 50, the leading deflector arm 140 makes its initial contact with the non-planar area 16. As the leading deflector arm 140 begins to engage the non-planar area 16 (FIG. 51), the leading deflector arm 140 swings rearward, away from the direction of travel and non-planar area 16, and starts to lift and rotate the leading wheel 56 of the mobility device 10, which will begin to lift the object 12 over the non-planar area 14 in a smooth and gradual manner. As the mobility device 10 continues to advance over the non-planar area 14, the leading deflector arm 140 swings back sufficiently enough that the leading wheel 56 makes contact with the non-planar area 16, as shown in FIG. 52, while the leading deflector arm 140 continues to raise and rotate the walking wheel assembly 20. FIG. 53 shows that as the mobility device 10 advances over the non-planar area 14, the leading wheel 56 of the walking wheel assembly 20 takes on the load of the object 12 from the leading deflector arm 140, allowing the leading deflector arm 140 to swing back, due to the return spring 174, toward its neutral position, and the trailing deflector arm 142, which has been in its neutral position, makes contact with surface 14.

Figure 54:
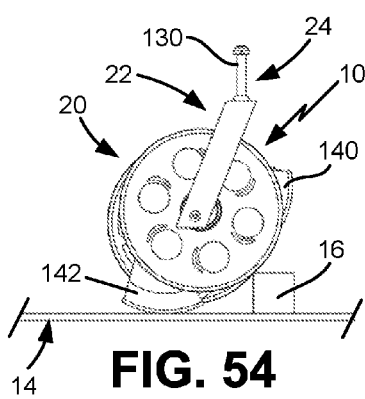
Figure 55:
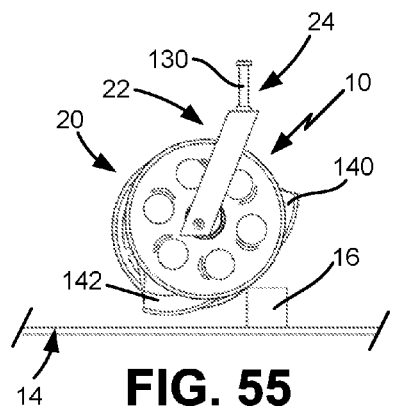
Figure 56:
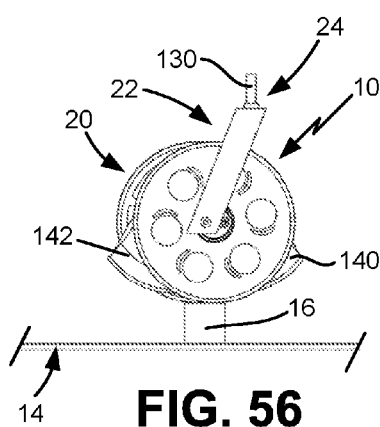
Figure 57:
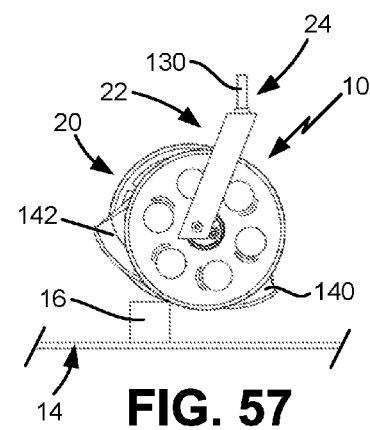
Figure 58:
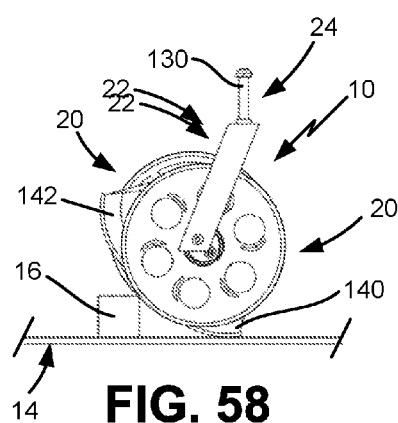
Figure 59:
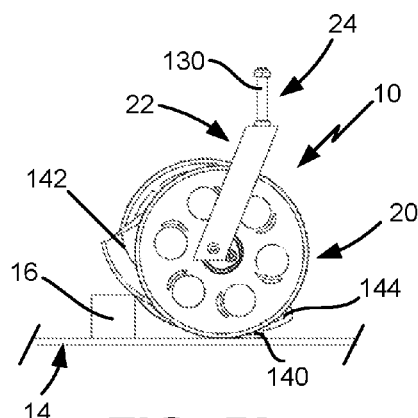
Figure 60:
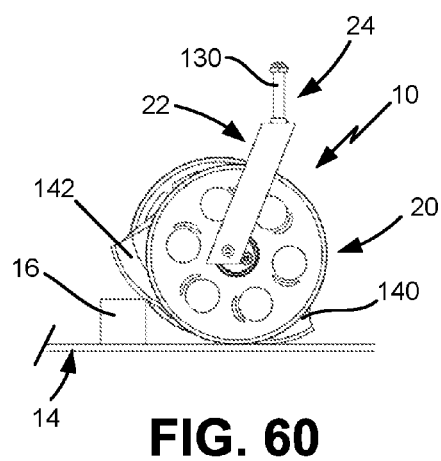
Figure 61:
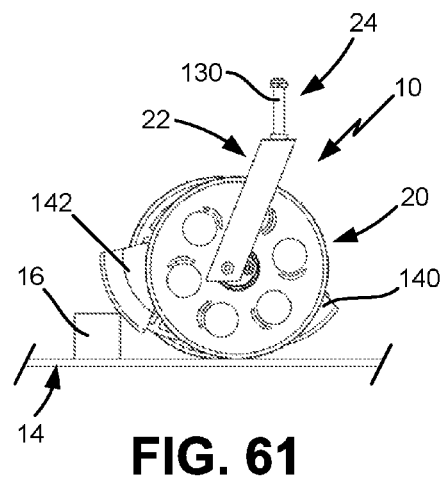

In FIG. 54, the trailing deflector arm 142 is taking on the weight of the object 12 from the leading wheel 56. The trailing deflector arm 142 swings back in a smooth rolling motion, which helps direct the forward energy of the mobility device 10 up and over the non-planar area 16 to reduce the resistance to forward travel for the mobility device 10. FIG. 55 shows the trailing deflector arm 142 continuing to swing out as the mobility device 10 advances forward over the non-planar area 16. When the mobility device 10 has advanced slightly further (FIG. 56), the weight of the object 12 will be on the wheels 56/58 and the trailing deflector arm 142 will swing back, as a result of the return swing 174, to its neutral position. The two deflector arms 140/142 will remain in their neutral positions, as shown in FIG. 57, as the mobility device 10 crests over the non-planar area 16. As the mobility device 10 traverses the non-planar area 16 and it heads back toward the surface 14, the leading deflector arm 140 will make contact with the surface 14, as shown in FIG. 58. As described above, the leading deflector arm 140 will swing rearward as the mobility device 10 advances forward, as shown in FIG. 59. In the process, the trailing wheel 58 will slow the rate of descent of the walking wheel assembly 20, which assists in the forward movement of the mobility device 10 and object 12. As shown in FIG. 60, the continued forward movement of the mobility device 10 will cause the trailing deflector arm 142 to engage the non-planar area 16. As the walking wheel assembly 20 begins to rotate level again, the leading wheel 56 will reassume the weight of the object 12 and the leading deflector arm 140 will begin to spring back to its neutral position. Continued forward movement, shown in FIG. 61, will cause the trailing deflector arm 142 to continue to swing rearward to help ease the rate of descent of the walking wheel assembly 20 off of the non-planar area 16, as was previously done by the leading deflector arm 140. The trailing wheel 58 will contact the floor and begin taking on some of the weight of the object 12. When the mobility device 10 has cleared the non-planar area 16, as shown in FIG. 62, the weight of the object 12 will be fully borne by the two wheels 56/58 and the two deflector arms 140/142 will swing back to their neutral positions, as a result of the return spring 174. The mobility device 10 can then continue to move the object 12 along the surface 14.

The operation and use of the various embodiments of the mobility device 10 of the present invention are set forth above and the benefits thereof will be readily appreciated by persons who are skilled in the relevant art. In addition, as also will be readily appreciated by persons skilled in the art, the walking wheel assemblies 20 described above can be easily retrofitted into most existing mobility devices by removing the existing wheel assembly from the existing pedestal, usually requiring removal of a single bolt, and then placing one of the new the walking wheel assemblies 20 into the existing pedestal using the axle bolt 52 to secure the walking wheel assembly 20 to the existing pedestal to obtain the mobility device 10 present invention.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there are numerous components described herein that can be replaced with equivalent functioning components to accomplish the objectives of the present invention.

What is claimed is:

1. A mobility device for moving an object across a surface, said mobility device comprising:
a walking wheel assembly having at least a first wheel, a second wheel and an offset camshaft interconnecting said first wheel and said second wheel, each of said first wheel and said second wheel made out of materials selected to move said mobility device across the surface, said offset camshaft having a first lobe associated with said first wheel and a second lobe associated with said second wheel, said offset camshaft structured and arranged with said first lobe in a non-linear relationship with said second lobe so as to define one of said first wheel and said second wheel as a leading wheel and the other of said first wheel and said second wheel as a trailing wheel, said offset camshaft further structured and arranged to pivot one of said first wheel and said second wheel upward or downward relative to the other of said first wheel and said second wheel when one of said first wheel and said second wheel contacts a non-planar area on the surface; and
an attachment means for attaching said walking wheel assembly to said object so as to moveably support the object on the surface and across or over the non-planar area.

2. The mobility device of claim 1, wherein said attachment means comprises an axle bolt sized and configured to extend through said offset camshaft and each of said first wheel and said second wheel so as to secure said mobility device to one or more frame members of the object.

3. The mobility device of claim 1, wherein said attachment means comprises a caster assembly having a pedestal moveably supported above the surface by said walking wheel assembly, said pedestal having a mounting device structured and arranged to attach to the object and a support frame having one more frame members interconnecting said mounting device and said walking wheel assembly, said pedestal configured to allow each of said first wheel and said second wheel to move straight and pivot on the surface relative to the object so as to directionally move the object.

4. The mobility device of claim 3, wherein said pedestal further comprises a pivoting mechanism interconnecting said mounting device and said support frame to allow said support frame and said walking wheel assembly to pivot relative to said mounting device.

5. The mobility device of claim 3, wherein said mounting device is one of a mounting plate and a pivot pin.

6. The mobility device of claim 3, wherein said walking wheel assembly further comprises an axle bolt sized and configured to extend through said offset camshaft and each of said first wheel and said second wheel so as to clamp said first wheel, said offset camshaft and said second wheel together.

7. The mobility device of claim 3, wherein said support frame of said pedestal comprises a first frame member associated with said first wheel and a second frame member associated with said second wheel, each of said first wheel and said second wheel disposed between said first frame member and said second frame member, said offset camshaft disposed between and interconnecting said first wheel and said second wheel with an axle bolt sized and configured to secure said first wheel, said offset camshaft, said second wheel, said first frame member and said second frame member together.

8. The mobility device of claim 3, wherein said support frame of said pedestal comprises a single frame member disposed between said first wheel and said second wheel with an axle bolt sized and configured to secure said first wheel, said second wheel and said offset camshaft to said frame member of said support frame, said offset camshaft structured and arranged to dispose said first lobe and said second lope on opposite sides of said mobility device and to allow said first lobe and said second lobe to rotate and pivot independent of said frame member and each other.

9. The mobility device of claim 1 further comprising a deflector assembly disposed between said first wheel and said second wheel, said deflector assembly having a cam-axle attached to or integral with said offset camshaft, a leading deflector arm pivotally attached to said cam-axle and a trailing deflector arm pivotally attached to said cam-axle, each of said leading deflector arm and said trailing deflector arm sized and configured to contact the non-planar area to assist in moving the object over or across the non-planar area.

10. The mobility device of claim 9, wherein said cam-axle of said deflector assembly comprises a frame defining a leading section toward a leading end of said cam-axle and a trailing section toward a trailing end of said cam-axle, said leading deflector arm pivotally attached to said leading section so as to pivot forward and rearward and said trailing deflector arm pivotally attached to said trailing section so as to pivot forward and rearward.

11. The mobility device of claim 10, wherein each of said leading deflector arm and said trailing deflector arm comprise a first deflector plate, a second deflector plate in spaced apart relation to said first deflector plate and a contact member joining said first deflector plate and said second deflector plate at a lower end of each of said leading deflector arm and said trailing deflector arm so as to define a slot therebetween that is open at an upper end of each of said leading deflector arm and said trailing deflector arm, said leading section of said cam-axle and said slot of said leading deflector arm cooperatively sized and configured for said leading section to be pivotally disposed in said slot of said leading arm, said trailing section of said cam-axle and said slot of said trailing deflector arm cooperatively sized and configured for said trailing section to be pivotally disposed in said slot of said trailing arm.

12. The mobility device of claim 11, wherein each of said leading section and said trailing section of said cam-axle have a return spring associated therewith, said return spring of said leading section interconnecting said leading section and said leading deflector arm, said return spring of said trailing section interconnecting said trailing section and said trailing deflector arm.

13. The mobility device of claim 12, wherein each of said leading section and said trailing section have a spring cavity, said return spring of said leading section disposed in said spring cavity of said leading section, said return spring of said trailing section disposed in said spring cavity of said trailing section.

14. The mobility device of claim 1, wherein said offset camshaft of said walking wheel assembly further comprises a third lobe and a third wheel associated with said third wheel, said offset camshaft configured with said third lobe in a generally linear relationship with said first lobe so as to define both of said first wheel and said third wheel as either the leading wheels or the trailing wheels.

15. The mobility device of claim 1, wherein each of said first lobe and said second lobe of said offset camshaft comprise an inner lobe plate, an outer lobe plate, a lobe tube and a lobe member disposed between said inner lobe plate and said outer lobe plate, at least one of said outer lobe plate and said inner lobe plate having a tube aperture sized and configured to receive said lobe tube, said lobe tube sized and configured to receive a bearing tube therethrough, said bearing tube having a sleeve disposed therein, said sleeve being sized and configured to receive an axle bolt therethrough, said axle bolt sized and configured to engage said sleeve so as to clamp said inner lobe plate, said outer lobe plate and said lobe hub together.

16. The mobility device of claim 1, wherein said offset camshaft comprises a connecting hub attached to or integral with a mounting device, said connecting hub having a pin on each of said first side and said second side of said connecting hub that engages and interconnects said first lobe and said second lobe, said connecting hub being configured to allow said first lobe and said second lobe to pivot independently of each other.

17. The mobility device of claim 1, wherein said attachment means comprises a caster assembly having a pedestal moveably supported above the surface by said walking wheel assembly, said pedestal having a mounting device structured and arranged to attach to the object and a support frame having one more frame members interconnecting said mounting device and said walking wheel assembly, said pedestal configured to allow each of said first wheel and said second wheel to move straight and pivot on the surface relative to the object so as to directionally move the object, said mounting device being one of a mounting plate and a pivot pin.

18. The mobility device of claim 17 further comprising a deflector assembly disposed between said first wheel and said second wheel, said deflector assembly having a cam-axle attached to or integral with said offset camshaft, a leading deflector arm pivotally attached to said cam-axle and a trailing deflector arm pivotally attached to said cam-axle, each of said leading deflector arm and said trailing deflector arm sized and configured to contact the non-planar area to assist in moving the object over or across the non-planar area.

19. A mobility device for moving an object across a surface, said mobility device comprising:
a walking wheel assembly having at least a first wheel, a second wheel, an offset camshaft interconnecting said first wheel and said second wheel and an axle bolt sized and configured to extend through said offset camshaft and each of said first wheel and said second wheel so as to clamp said first wheel, said offset camshaft and said second wheel together, each of said first wheel and said second wheel made out of materials selected to move said mobility device across the surface, said offset camshaft having a first lobe associated with said first wheel and a second lobe associated with said second wheel, said offset camshaft structured and arranged with said first lobe in a non-linear relationship with said second lobe so as to define one of said first wheel and said second wheel as a leading wheel and the other of said first wheel and said second wheel as a trailing wheel, said offset camshaft further structured and arranged to pivot one of said first wheel and said second wheel upward or downward relative to the other of said first wheel and said second wheel when one of said first wheel and said second wheel contacts a non-planar area on the surface; and an attachment means for attaching said walking wheel assembly to said object so as to moveably support the object on the surface and across or over the non-planar area.

20. A mobility device for moving an object across a surface, said mobility device comprising:

a walking wheel assembly having at least a first wheel, a second wheel, an offset camshaft interconnecting said first wheel and said second wheel and an axle bolt sized and configured to extend through said offset camshaft and each of said first wheel and said second wheel so as to clamp said first wheel, said offset camshaft and said second wheel together, each of said first wheel and said second wheel made out of materials selected to move said mobility device across the surface, said offset camshaft having a first lobe associated with said first wheel and a second lobe associated with said second wheel, each of said first lobe and said second lobe having an inner lobe plate, an outer lobe plate, a lobe tube associated with one of said inner lobe plate and said outer lobe plate, a lobe member disposed between said inner lobe plate and said outer lobe plate and a securing pin interconnecting said inner lobe plate, said lobe member and said outer lobe plate, said lobe member having a tube engagement opening sized and configured to engage said lobe tube so as to allow said lobe member to rotate relative to said lobe tube, said offset camshaft structured and arranged with said first lobe in a non-linear relationship with said second lobe so as to define one of said first wheel and said second wheel as a leading wheel and the other of said first wheel and said second wheel as a trailing wheel, said offset camshaft further structured and arranged to pivot one of said first wheel and said second wheel upward or downward relative to the other of said first wheel and said second wheel when one of said first wheel and said second wheel contacts a non-planar area on the surface; and an attachment means for attaching said walking wheel assembly to said object so as to moveably support the object on the surface and across or over the non-planar area.

* * * * *